US012432583B2

(12) United States Patent
Khoshnevisan et al.

(10) Patent No.: US 12,432,583 B2
(45) Date of Patent: Sep. 30, 2025

(54) QUASI CO-LOCATION (QCL) PRIORITIZATION RULES FOR MULTI-TRANSMISSION CONFIGURATION INDICATOR (TCI) STATE CONTROL RESOURCE SET (CORESET)

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Tao Luo, San Diego, CA (US); Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1071 days.

(21) Appl. No.: 17/458,205

(22) Filed: Aug. 26, 2021

(65) Prior Publication Data
US 2022/0070704 A1 Mar. 3, 2022

Related U.S. Application Data

(60) Provisional application No. 63/072,063, filed on Aug. 28, 2020.

(51) Int. Cl.
*H04W 24/08* (2009.01)
*H04W 72/0453* (2023.01)
(Continued)

(52) U.S. Cl.
CPC ....... *H04W 24/08* (2013.01); *H04W 72/0453* (2013.01); *H04W 72/23* (2023.01); *H04W 72/56* (2023.01)

(58) Field of Classification Search
None
See application file for complete search history.

(56) References Cited

U.S. PATENT DOCUMENTS

| | | | |
|---|---|---|---|
| 2020/0045569 A1* | 2/2020 | Seo | H04W 72/23 |
| 2020/0145982 A1* | 5/2020 | Cheng | H04W 72/23 |

(Continued)

OTHER PUBLICATIONS

Ericsson: "Maintenance For Simultaneous RX and TX", 3GPP TSG-RAN WG1 Meeting #95, R1-1813251, 3rd Generation Partnership Project, Mobile Competence Centre, 650, Route Des Lucioles, F-06921 Sophia-Antipolis Cedex, France, vol. RAN WG1, No. Spokane, United States, Nov. 12, 2018-Nov. 16, 2018, Nov. 11, 2018, 4 Pages, XP051555267, sections 2, 2.2, 2.3.

(Continued)

*Primary Examiner* — Srinivasa R Reddivalam
(74) *Attorney, Agent, or Firm* — Paul M. McAdams; Seyfarth Shaw LLP

(57) ABSTRACT

A method of wireless communication performed by a user equipment (UE) includes receiving a message indicating multiple control resource sets (CORESETs). Each CORESET of the multiple CORESETs comprising one or more quasi-co-location (QCL)-Type-D properties and associated with a respective physical downlink control (PDCCH) monitoring occasion of overlapping PDCCH monitoring occasions. One or more respective PDCCH candidates corresponding to the respective PDCCH monitoring occasion. The method also includes receiving, on one or more component carriers (CCs) operating on a same band, simultaneous beams comprising multiple PDCCH candidates. The method further includes monitoring a set of PDCCH candidates of the plurality of PDCCH candidates comprising a first CORESET of the multiple CORESETs comprising a first QCL-Type-D property, a second CORESET of the multiple CORESETs associated with a second QCL-Type-D (Continued)

property, and a set of monitoring CORESETs of the multiple CORESETs. Each of the monitoring CORESET associated with one or both of the first QCL-Type-D property or the second QCL-Type-D property based on a number of QCL-Type-D properties of a respective monitoring CORESET. In some examples, the first CORESET is a highest priority CORESET based on a set of priority rules.

23 Claims, 10 Drawing Sheets

(51) Int. Cl.
*H04W 72/23* (2023.01)
*H04W 72/56* (2023.01)

(56) References Cited

U.S. PATENT DOCUMENTS

| | | | |
|---|---|---|---|
| 2020/0221428 A1 | 7/2020 | Moon et al. | |
| 2020/0229008 A1 | 7/2020 | Islam et al. | |
| 2021/0058113 A1* | 2/2021 | Jung | H04W 72/23 |
| 2021/0337453 A1* | 10/2021 | Gao | H04B 7/0639 |
| 2021/0345299 A1* | 11/2021 | Gao | H04W 72/02 |
| 2023/0076897 A1* | 3/2023 | Svedman | H04W 72/23 |

OTHER PUBLICATIONS

Intel Corporation: "Corrections To Multi TRP", 3GPP TSG RAN WG1 #102-e, R1-2005853, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, 2 Pages, XP051917754, sections 1, 2.

Qualcomm Incorporated: "On NR Mobility Enhancements", 3GPP TSG-RAN WG1 Meeting #98b, R1-1911136, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019 Oct. 5, 2019, 8 Pages, XP051789912, sections 2.2.1, 2.2.3.

International Search Report and Written Opinion—PCT/US2021/048023—ISA/EPO—Apr. 5, 2022.

Nokia, et al., "Maintenance of Rel-16 Multi-TRP Operation", 3GPP TSG RAN WG1 Meeting #101, 3GPP Draft, R1-2004265, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, 16 Pages, May 16, 2020 (May 16, 2020), XP051886018, Retrieved from the Internet: URL: https://ftp.3gpp.org/tsg_ran/WG1_RL1/TSGR1_101-e/Docs/R1-2004265.zip R1-2004265.docx [retrieved on May 16, 2020] Sections 2.1.3, 2.1.8, Annex I.

Nokia, et al., "Maintenance of Rel-16 Multi-TRP Operation", 3GPP TSG RAN WG1 Meeting #102-e, 3GPP Draft, R1-2006842, 3rd Generation Partnership Project (3GPP), Mobile Competence Centre, 650, Route Des Lucioles, F- 06921 Sophia-Antipolis Cedex, France, vol. RAN WG1, No. e-Meeting, Aug. 17, 2020-Aug. 28, 2020, 9 Pages, Aug. 7, 2020 (Aug. 7, 2020), XP051915487, Retrieved from the Internet: URL: https://ftp.3gpp.org/tsg_ran/WG1_RL1/TSGR1_102-e/Docs/R1-2006842.zip R1-2006842.docx [retrieved on Aug. 7, 2020], Sections 2.1.1, 2.1.4, Annex I.

Nokia, et al., "Outcome of Email Thread [100e-NR-LTE_NR_DC_CA_enh-Cross-CCScheduling 02]", 3GPP TSG RAN WG1 #100, 3GPP Draft, R1-2001353, 3rd Generation Partnership Project (3GPP), Mobile Competence Centre, 650, Route Des Lucioles, F-06921 Sophia-Antipolis Cedex, France, vol. RAN WG1, No. e-meeting, Feb. 18, 2020-Mar. 6, 2020, 3 Pages, Mar. 6, 2020 (Mar. 6, 2020), XP051860408, Retrieved from the Internet: URL: https://ftp.3gpp.org/tsg_ran/WG1_RL1/TSGR1_100_e/Docs/R1-2001353.zip R1-2001353 Cross-CCScheduling-02.docx.

Partial International Search Report—PCT/US2021/048023—ISA/EPO—Feb. 3, 2022.

Qualcomm Incorporated: "Enhancements on Beam Management for Multi-TRP", 3GPP Draft, 3GPP TSG RAN WG1 Meeting #102-e, R1-2006793, 3rd Generation Partnership Project (3GPP), Mobile Competence Centre, 650, Route Des Lucioles, F-06921 Sophia-Antipolis Cedex, France, vol. RAN WG1, No. Aug. 17, 2020-Aug. 28, 2020, Aug. 8, 2020 (Aug. 8, 2020), XP051918243, 4 Pages, Retrieved from the Internet: URL: https://ftp.3gpp.org/tsg_ran/WG1_RL1/TSGR1_102-e/Docs/R1-2006793.zip R1-2006793 Enhancements on beam management for multi-TRP.docx.

* cited by examiner

800 ⟶

802 — RECEIVE A MESSAGE INDICATING MULTIPLE CORESETS, EACH CORESET OF THE MULTIPLE CORESETS COMPRISING ONE OR MORE QCL-TYPE-D PROPERTIES AND ASSOCIATED WITH A RESPECTIVE PDCCH MONITORING OCCASION OF A PLURALITY OF OVERLAPPING PDCCH MONITORING OCCASIONS, AND ONE OR MORE RESPECTIVE PDCCH CANDIDATES CORRESPONDING TO THE RESPECTIVE PDCCH MONITORING OCCASION

804 — RECEIVE, ON ONE OR MORE CCS OPERATING ON A SAME BAND, MULTIPLE SIMULTANEOUS BEAMS COMPRISING MULTIPLE PDCCH CANDIDATES

806 — MONITOR A SET OF PDCCH CANDIDATES OF THE MULTIPLE PDCCH CANDIDATES ASSOCIATED WITH A FIRST CORESET OF THE MULTIPLE CORESETS ASSOCIATED WITH A FIRST QCL-TYPE-D PROPERTY, A SECOND CORESET OF THE MULTIPLE CORESETS ASSOCIATED WITH A SECOND QCL-TYPE-D PROPERTY, AND A SET OF MONITORING CORESETS OF THE MULTIPLE CORESETS

*FIG. 8*

QUASI CO-LOCATION (QCL) PRIORITIZATION RULES FOR MULTI-TRANSMISSION CONFIGURATION INDICATOR (TCI) STATE CONTROL RESOURCE SET (CORESET)

CROSS-REFERENCE TO RELATED APPLICATION

The present application claims the benefit of U.S. Provisional Patent Application No. 63/072,063, filed on Aug. 28, 2020, and titled "QUASI CO-LOCATION (QCL) PRIORITIZATION RULES FOR MULTI-TRANSMISSION CONFIGURATION INDICATOR (TCI) STATE CONTROL RESOURCE SET (CORESET)," the disclosure of which is expressly incorporated by reference in its entirety.

FIELD OF THE DISCLOSURE

Aspects of the present disclosure generally relate to wireless communication, and more particularly to quasi co-location (QCL) prioritization rules for multi-transmission configuration indicator (TCI) state control resource sets (CORESETs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

A user equipment (UE) may be unaware of a physical downlink control channel (PDCCH) aggregation level or whether multiple PDCCHs exist in a subframe or slot. Therefore, the UE may perform blind decoding of various decoding candidates. A UE-specific search space (USS) and a common search space (CSS) may reduce a number of blind decodes. Each PDCCH search space candidate, such as a CSS candidate or USS candidate, may be associated with a transmission configuration indicator (TCI) state. The TCI state may indicate quasi-co-location (QCL) information, such as a QCL-Type and time-frequency resources, of a demodulation reference signal (DMRS) for the PDCCH search space candidate. A control resource set (CORESET) may configure parameters, such as frequency and time-domain resources, and a scrambling sequence identity for the DMRS for the PDCCH search space candidate. In some scenarios, a UE may identify multiple PDCCH candidates in overlapping PDCCH monitoring occasions across multiple CORESETs. The UE may attempt to decode one or more PDCCH candidates based on a priority rule.

SUMMARY

In one aspect of the present disclosure, a method for wireless communication by a user equipment (UE) includes receiving a message indicating multiple control resource sets (CORESETs), each CORESET of the multiple CORESETs comprising one or more QCL-Type-D properties and associated with a respective PDCCH monitoring occasion of overlapping PDCCH monitoring occasions. One or more respective PDCCH candidates corresponding to the respective PDCCH monitoring occasion. The method further includes receiving, on one or more component carriers (CCs) operating on a same band, multiple simultaneous beams comprising multiple PDCCH candidates. The method still further includes monitoring a set of PDCCH candidates of the multiple PDCCH candidates associated with a first CORESET of the multiple CORESETs associated with a first QCL-Type-D property, a second CORESET of the multiple CORESETs comprising a second QCL-Type-D property, and a set of monitoring CORESETs of the multiple CORESETs, each monitoring CORESET associated with one or both of the first QCL-Type-D property or the second QCL-Type-D property based on a number of QCL-Type-D properties of a respective monitoring CORESET. The first CORESET may be a highest priority CORESET based on a set of priority rules.

Another aspect of the present disclosure is directed to an apparatus for wireless communication at a UE. The apparatus includes means for receiving a message indicating multiple CORESETs, each CORESET of the multiple CORESETs comprising one or more QCL-Type-D properties and associated with a respective PDCCH monitoring occasion of overlapping PDCCH monitoring occasions. One or more respective PDCCH candidates corresponding to the respective PDCCH monitoring occasion. The apparatus further includes means for receiving, on one or more CCs operating on a same band, multiple simultaneous beams comprising multiple PDCCH candidates. The apparatus still further includes means for monitoring a set of PDCCH candidates of the multiple PDCCH candidates associated with a first CORESET of the multiple CORESETs associated with a first QCL-Type-D property, a second CORESET of the multiple CORESETs comprising a second QCL-Type-D property, and a set of monitoring CORESETs of the multiple CORESETs, each monitoring CORESET associated with one or both of the first QCL-Type-D property or the second QCL-Type-D property based on a number of QCL-Type-D properties of a respective monitoring CORESET. The first CORESET may be a highest priority CORESET based on a set of priority rules.

In another aspect of the present disclosure, a non-transitory computer-readable medium with non-transitory program code recorded thereon for wireless communication at a UE is disclosed. The program code is executed by a processor and includes program code to receive a message indicating multiple CORESETs, each CORESET of the multiple CORESETs comprising one or more QCL-Type-D properties and associated with a respective PDCCH monitoring occasion of overlapping PDCCH monitoring occasions. One or more respective PDCCH candidates corresponding to the respective PDCCH monitoring occasion. The program code further includes program code to receive, on one or more CCs operating on a same band, multiple simultaneous beams comprising multiple PDCCH candidates. The program code still further includes program code to monitor a set of PDCCH candidates of the multiple PDCCH candidates associated with a first CORESET of the multiple CORESETs associated with a first QCL-Type-D property, a second CORESET of the multiple CORESETs comprising a second QCL-Type-D property, and a set of monitoring CORESETs of the multiple CORESETs, each monitoring CORESET associated with one or both of the first QCL-Type-D property or the second QCL-Type-D property based on a number of QCL-Type-D properties of a respective monitoring CORESET. The first CORESET may be a highest priority CORESET based on a set of priority rules.

Another aspect of the present disclosure is directed to an apparatus for wireless communications at a UE. The apparatus includes a processor, a memory coupled with the processor, and instructions stored in the memory and operable, when executed by the processor, to cause the apparatus to receive a message indicating multiple CORESETs, each CORESET of the multiple CORESETs comprising one or more QCL-Type-D properties and associated with a respective PDCCH monitoring occasion of overlapping PDCCH monitoring occasions. One or more respective PDCCH candidates corresponding to the respective PDCCH monitoring occasion. Execution of the instructions also cause the apparatus to receive, on one or more CCs operating on a same band, multiple simultaneous beams comprising multiple PDCCH candidates. Execution of the instructions still further cause the apparatus to monitor a set of PDCCH candidates of the multiple PDCCH candidates associated with a first CORESET of the multiple CORESETs associated with a first QCL-Type-D property, a second CORESET of the multiple CORESETs comprising a second QCL-Type-D property, and a set of monitoring CORESETs of the multiple CORESETs, each monitoring CORESET associated with one or both of the first QCL-Type-D property or the second QCL-Type-D property based on a number of QCL-Type-D properties of a respective monitoring CORESET. The first CORESET may be a highest priority CORESET based on a set of priority rules.

In one aspect of the present disclosure, a method for wireless communication by a UE includes receiving a message indicating multiple CORESETs, each CORESET of the multiple CORESETs comprising one or more QCL-Type-D properties. The method further includes receiving a single beam including multiple PDCCH candidates in overlapping PDCCH monitoring occasions across the multiple CORESETS. The method still further includes monitoring PDCCH candidates associated with both a first CORESET occupying a set of symbols and a first set of CORESETs each occupying a single symbol that overlaps one symbol of the set of symbols. The single symbol may be associated with a same QCL-Type-D property as a QCL-Type-D property associated with the one overlapping symbol of the set of symbols, and each symbol of the set of symbols may be associated with a QCL-Type-D property. The first CORESET may be a highest priority CORESET based on a set of priority rules.

Another aspect of the present disclosure is directed to an apparatus for wireless communication at a UE. The apparatus includes means for receiving a message indicating multiple CORESETs, each CORESET of the multiple CORESETs comprising one or more QCL-Type-D properties. The apparatus further includes means for receiving a single beam including multiple PDCCH candidates in overlapping PDCCH monitoring occasions across the multiple CORESETS. The apparatus still further includes means for monitoring PDCCH candidates associated with both a first CORESET occupying a set of symbols and a first set of CORESETs each occupying a single symbol that overlaps one symbol of the set of symbols. The single symbol may be associated with a same QCL-Type-D property as a QCL-Type-D property associated with the one overlapping symbol of the set of symbols, and each symbol of the set of symbols may be associated with a QCL-Type-D property. The first CORESET may be a highest priority CORESET based on a set of priority rules.

In another aspect of the present disclosure, a non-transitory computer-readable medium with non-transitory program code recorded thereon for wireless communication at a UE is disclosed. The program code is executed by a processor and includes program code to receive a message indicating multiple CORESETs, each CORESET of the multiple CORESETs comprising one or more QCL-Type-D properties. The program code further includes program code to receive a single beam including multiple PDCCH candidates in overlapping PDCCH monitoring occasions across the multiple CORESETS. The program code still further includes program code to monitor PDCCH candidates associated with both a first CORESET occupying a set of symbols and a first set of CORESETs each occupying a single symbol that overlaps one symbol of the set of symbols. The single symbol may be associated with a same QCL-Type-D property as a QCL-Type-D property associated with the one overlapping symbol of the set of symbols, and each symbol of the set of symbols may be associated with a QCL-Type-D property. The first CORESET may be a highest priority CORESET based on a set of priority rules.

Another aspect of the present disclosure is directed to an apparatus for wireless communications at a UE. The apparatus includes a processor, a memory coupled with the processor, and instructions stored in the memory and operable, when executed by the processor, to cause the apparatus to receive a message indicating multiple CORESETs, each CORESET of the multiple CORESETs comprising one or more QCL-Type-D properties. The processor(s) is further configured to receive a single beam including multiple PDCCH candidates in overlapping PDCCH monitoring occasions across the multiple CORESETS. The processor(s) is still further configured to monitor PDCCH candidates associated with both a first CORESET occupying a set of symbols and a first set of CORESETs each occupying a single symbol that overlaps one symbol of the set of symbols. The single symbol may be associated with a same QCL-Type-D property as a QCL-Type-D property associated with the one overlapping symbol of the set of symbols, and each symbol of the set of symbols may be associated with a QCL-Type-D property. The first CORESET may be a highest priority CORESET based on a set of priority rules.

Aspects generally include a method, apparatus, system, computer program product, non-transitory computer-readable medium, user equipment, base station, wireless communications device, and processing system as substantially described with reference to and as illustrated by the accompanying drawings and specification.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 8 is a flow diagram illustrating an example process performed at a UE that supports identifying a set of PDCCH candidates for monitoring from multiple PDCCH candidates in overlapping PDCCH monitoring occasions across multiple CORESETs, in accordance with various aspects of the present disclosure.

DETAILED DESCRIPTION

Figure 1:
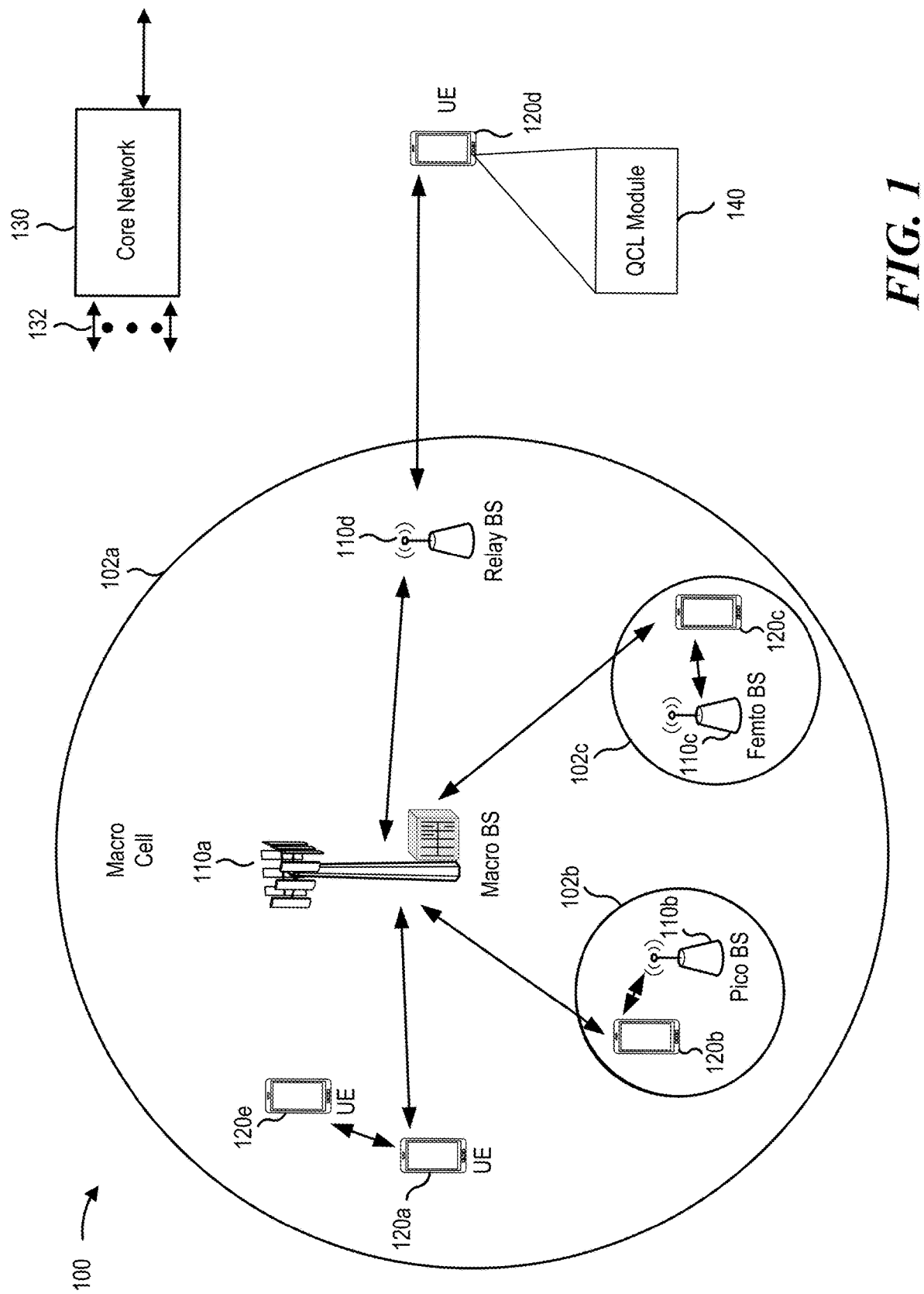
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Aspects of the present disclosure generally relate to techniques and apparatuses for selecting physical downlink control channel (PDCCH) candidates according to a prioritization rule when one or more control resource sets (CORESETs) are associated with two quasi-co-location (QCL)-Type-D properties. In some examples, a base station may configure a user equipment (UE) with more than one search space (SS) set, such that a number of PDCCH candidates may vary across slots. In this example, the UE may identify multiple PDCCH candidates in overlapping PDCCH monitoring occasions across multiple CORESETs, where one or more CORESETs may be associated with two QCL-Type-D properties.

In some examples, the UE is configured to simultaneously receive two beams from one or more component carriers (CCs). In such examples, the UE generates a prioritized list of CORESETs from multiple CORESETs according to a set of priority rules. The UE may select, from the prioritized list of CORESETs, a first highest priority CORESET as a first CORESET. The UE may also select a first QCL-Type-D property of the first CORESET as a first monitoring QCL-Type-D property, and may select a second QCL-Type-D property of a second CORESET from the prioritized list of CORESETs as a second monitoring QCL-Type-D property. The UE may also identify, from the prioritized list of CORESETs, a set of monitoring CORESETs, each monitoring CORESET of the set of monitoring CORESETs comprising a same QCL-Type-D property as one or both of the first monitoring QCL-Type-D property and the second monitoring QCL-Type-D property based on a number of QCL-Type-D properties of the respective monitoring CORESET. The UE may select a set of PDCCH candidates of the multiples of PDCCH candidates based on the first monitoring QCL-Type-D property and the second monitoring QCL-Type-D property. In such examples, the set of PDCCH candidates may correspond to the first CORESET, the second CORESET, and the set of monitoring CORESETs. The UE may monitor the set of PDCCH candidates.

In other examples, the UE is not configured to simultaneously receive two beams. In such examples, the UE selects, according a set of priority rules, a first highest priority CORESET from the multiple CORESETs as a first CORESET. The first CORESET may occupy a first set of symbols. The UE may determine a QCL-Type-D property for each symbol of the first set of symbols. Additionally, the UE may remove, from the multiple of CORESETs, a first set of CORESETs, where each CORESET of the first set of CORESETs occupies a symbol overlapping one of the first set of symbols, and the overlapping symbols are associated with different QCL-Type-D properties. The UE may also identify first remaining CORESETs of the multiple CORESETs in response to removing the first set of CORESETs. The UE may also identify, from the first remaining CORESETs, a second set of CORESETs. In such examples, each CORESET of the second set of CORESETs occupies a symbol overlapping one of the first set of symbols, and the overlapping symbols may be associated with a same QCL-Type-D property. The UE may monitor PDCCH candidates of the first CORESET and the second set of CORESETs.

Particular aspects of the subject matter described in this disclosure may be implemented to realize one or more of the following potential advantages. In some aspects, a UE can use the described techniques to monitor PDCCH candidates based on a prioritized list of CORESETs associated with one or two QCL-Type-D properties. Monitoring PDCCH candidates based on the prioritized list of CORESETs may reduce a quantity of PDCCH candidates monitored by the UE and also reduce a quantity of blind decodes performed by the UE, thereby increasing resources at the UE. Additionally, the described techniques may prepare the UE the use of CORESETs with two transmission configuration indicator (TCI) states, as proposed for 3GPP Release 17 and beyond.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a QCL module 140. For brevity, only one UE 120d is shown as including the QCL module 140. In one implementation, the QCL module 140 may identify multiple PDCCH candidates in overlapping PDCCH monitoring occasions across multiple CORESETs, where one or more CORESETs may be associated with a single QCL-Type-D property or two QCL-Type-D properties.

In some examples, the QCL module 140 may generates a prioritized list of CORESETs from the multiple CORESETs according to one or more priority rules. The QCL module 140 may select, from the prioritized list of CORESETs, a first highest priority CORESET as a first CORESET. The QCL module 140 may also select a first QCL-Type-D property of the first CORESET as a first monitoring QCL-Type-D property, and may select a second QCL-Type-D property of a second CORESET from the prioritized list of CORESETs as a second monitoring QCL-Type-D property. The QCL module 140 may also identify, from the prioritized list of CORESETs, a set of monitoring CORESETs, each monitoring CORESET of the set of monitoring CORESETs comprising a same QCL-Type-D property as one or both of the first monitoring QCL-Type-D property and the second monitoring QCL-Type-D property based on a number of QCL-Type-D properties of the respective monitoring CORESET. The QCL module 140 may select a set of PDCCH candidates of the multiples of PDCCH candidates based on the first monitoring QCL-Type-D property and the second monitoring QCL-Type-D property. In such examples, the set of PDCCH candidates may correspond to the first CORESET, the second CORESET, and the set of monitoring CORESETs. The QCL module 140 may monitor the set of PDCCH candidates.

In other examples, the QCL module 140 may select, according one or more priority rules, a first highest priority CORESET from the multiple CORESETs as a first CORESET. The first CORESET may occupy a first set of symbols. The QCL module 140 may determine a QCL-Type-D property for each symbol of the first set of symbols. Additionally, the QCL module 140 may remove, from the multiple of CORESETs, a first set of CORESETs, where each CORESET of the first set of CORESETs occupies a symbol overlapping one of the first set of symbols, and the overlapping symbols are associated with different QCL-Type-D properties. The QCL module 140 may also identify first remaining CORESETs of the multiple CORESETs in response to removing the first set of CORESETs. The QCL module 140 may also identify, from the first remaining CORESETs, a second set of CORESETs. In such examples, each CORESET of the second set of CORESETs occupies a symbol overlapping one of the first set of symbols, and the overlapping symbols may be associated with a same QCL-Type-D property. The QCL module 140 may monitor PDCCH candidates of the first CORESET and the second set of CORESETs.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
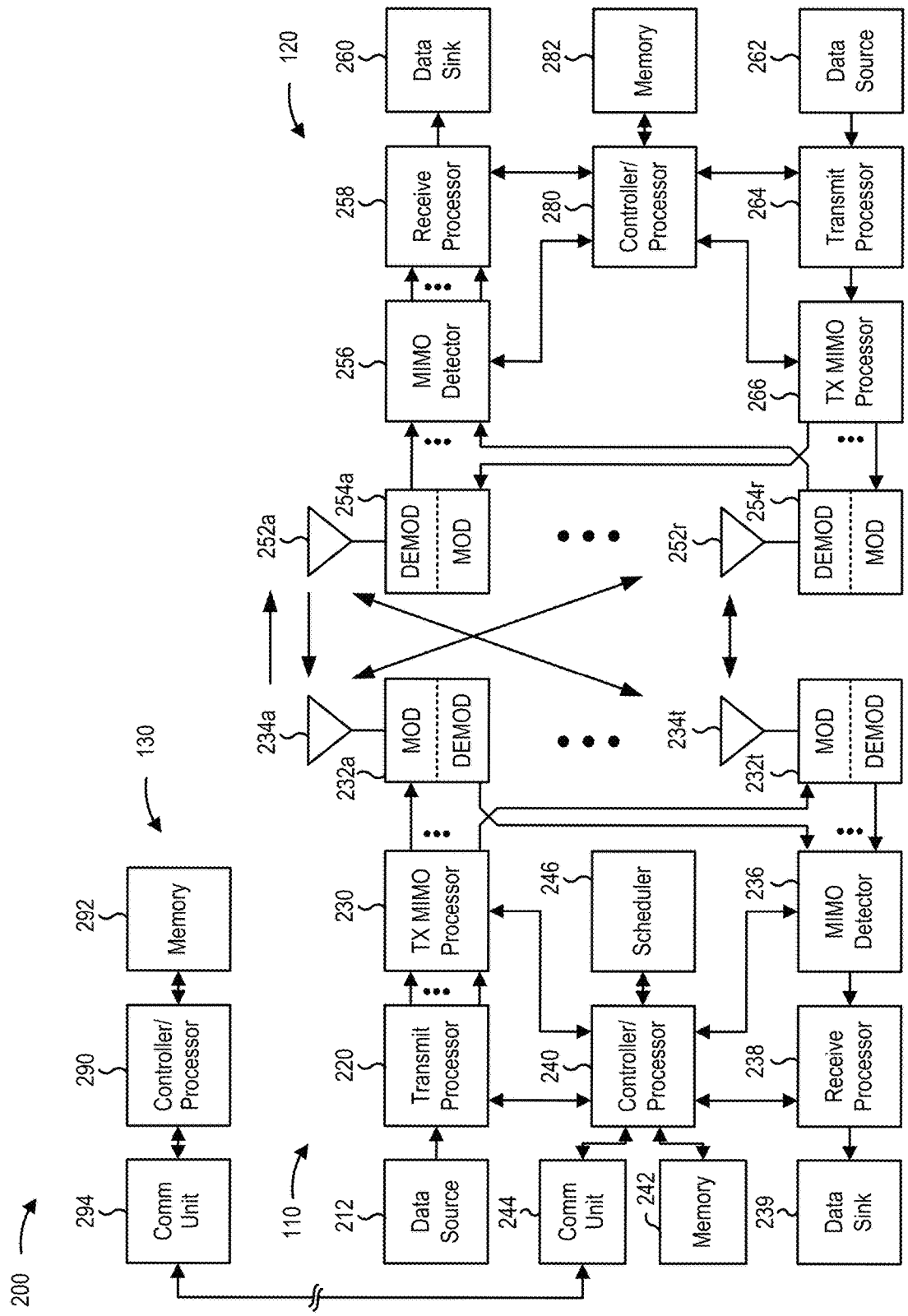
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with selecting PDCCH candidates for monitoring based on a priority rule as described in more detail elsewhere. For example, the controller/processor 240 of the base station 110, the controller/processor 280 of the UE 120, and/or any other component(s) of FIG. 2 may perform or direct operations of, for example, the process of FIGS. 8 and 9 and/or other processes as described. Memories 242 and 282 may store data and program codes for the base station 110 and UE 120, respectively. A scheduler 246 may schedule UEs for data transmission on the downlink and/or uplink.

A UE may be unaware of a PDCCH aggregation level or whether multiple PDCCHs exist in a subframe or slot. Therefore, the UE may perform blind decoding of various decoding candidates. A UE-specific search space (USS) and a common search space (CSS) may reduce a number of blind decodes. Each PDCCH search space candidate, such as a CSS candidate or USS candidate, may be associated with a TCI state. The TCI state may indicate QCL information, such as a QCL-Type and time-frequency resources, of a demodulation reference signal (DMRS) for the PDCCH search space candidate. Examples of QCL types may include one or more of Doppler shift (QCL-Types-A and B), Doppler spread (QCL-Types-A, B, and C), average delay (QCL-Type-A), delay spread (QCL-Types-A, B, and C), and a spatial receiving (RX) parameter (QCL-Type-D). A control resource set (CORESET) may configure parameters, such as frequency and time-domain resources, and a scrambling sequence identity for the DMRS for the PDCCH search space candidate.

In some scenarios, a UE may identify multiple PDCCH candidates in overlapping PDCCH monitoring occasions across multiple CORESETs. Conventional UEs may not simultaneously receive multiple beams, such as two beams with different QCL-Type-D properties, in a given serving cell or on multiple serving cells in a same frequency band with a carrier aggregation operation. Therefore, conventional UEs determine a CORESET based on a priority rule and monitor PDCCH candidates in the selected CORESET, as well as other CORESETs with a same QCL-Type-D property as the selected CORESET. The priority rule may first prioritize CSS CORESETs over USS CORESETs. Additionally, the priority rule may rank the CSS CORESETs and USS CORESETs in ascending order based on a serving cell index, and then based on a SS set index.

In 3GPP Release 17 and beyond, a CORESET may be associated with two TCI states, which may result in the CORESET including two QCL-Type-D properties. The two TCI states for the CORESET may be applied in a time division multiplexing (TDM) manner, a frequency division multiplexing (FDM) manner, or a space division multiplexing (SDM) manner. In some examples, a UE may monitor multiple frequency division multiplexed (FDM'd) or space division multiplexed (SDM'd) PDCCH candidates during a monitoring occasion when the UE is configured to simultaneously receive two beams. In another example, the UE may monitor multiple time division multiplexed (TDM'd) PDCCH candidates during the monitoring occasion when the UE is only configured to receive one beam during a symbol.

Figure 3:
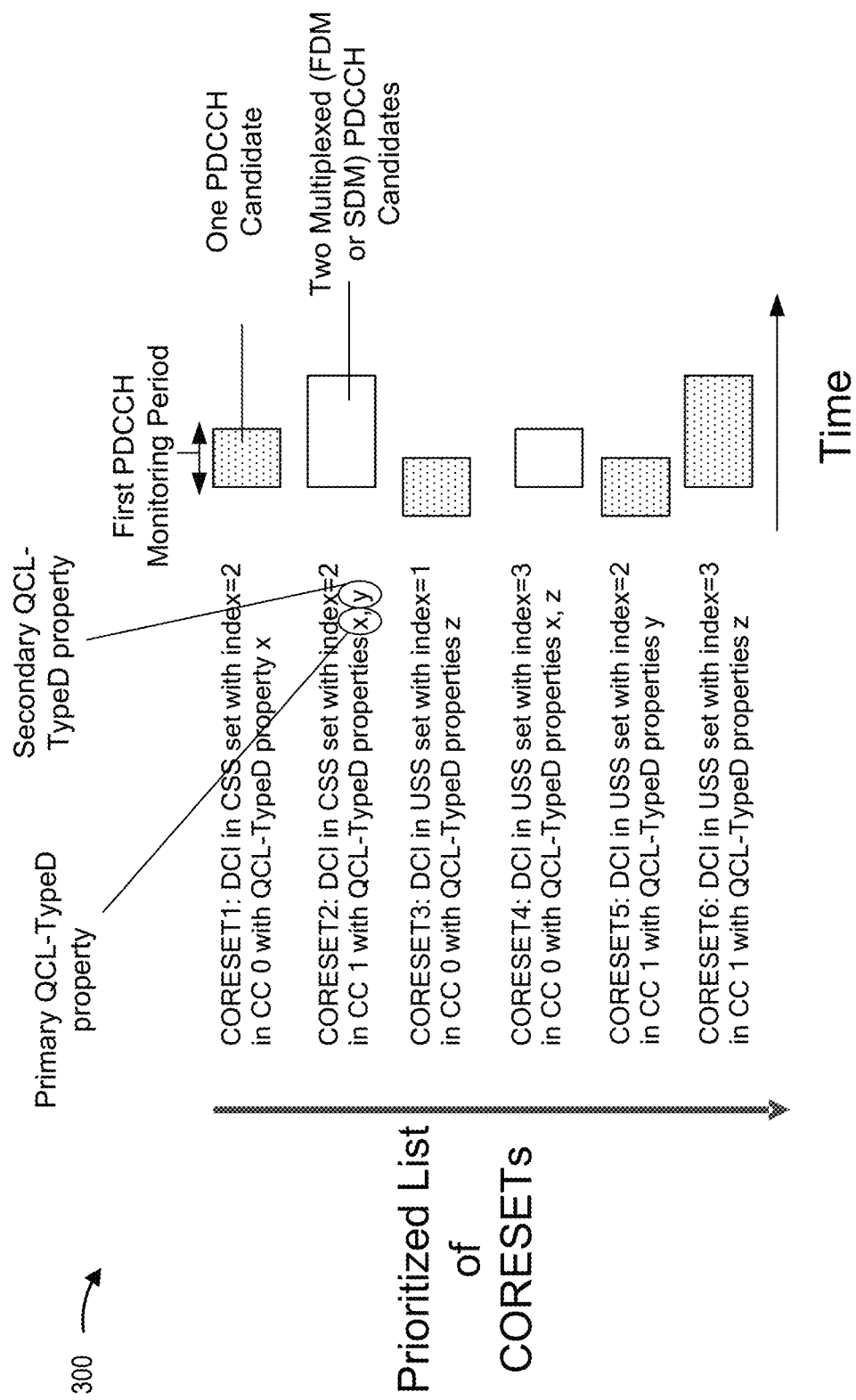
FIG. 3 is a diagram illustrating an example of multiple physical downlink control channel (PDCCH) candidates in overlapping PDCCH monitoring occasions, in accordance with aspects of the present disclosure.

In one configuration, a UE is configured to receive simultaneous beams from a same component carrier or different component carriers operating in a same band. In this configuration, the PDCCH candidates may be SDM'd or FDM'd. FIG. 3 is a diagram illustrating an example 300 of multiple PDCCH candidates with overlapping PDCCH monitoring occasions, in accordance with aspects of the present disclosure. In the example of FIG. 3, each CORESET of the multiple CORESETs (shown as CORESETs 1-6) may correspond to multiple PDCCH candidates in overlapping PDCCH monitoring occasions in two cells (CC0 and CC1 in the same band) and each CORESET has one or two QCL-Type D properties. For example, in FIG. 3, the first CORESET (CORESET 1) includes one QCL-Type-D property (x). Also, in the example of FIG. 3, the second CORESET (CORESET 2) includes two QCL-Type-D properties (x, y).

In one implementation, the UE generates a prioritized list of CORESETs from the multiple of CORESETs according to a priority rule. In the example of FIG. 3, the CORESETs are prioritized according to a priority rule. As described, the priority rule may prioritize based on SS type, serving cell index, and SS set index. In the example of FIG. 3, the CSS CORESETs (CORESET 1 and CORESET 2) are prioritized over the USS CORESETs (CORESETs 3-6). After prioritizing based on the SS, the CORESETs are prioritized based on a serving cell index, in ascending order. As shown in FIG. 3, the serving cell index (CC 0) of CORESET 1 is lower than the serving cell index (CC 1) of CORESET 2. Also, as shown in FIG. 3, the serving cell indices (CC 0) of CORESETs 3-4 are lower than the serving cell indices (CC 1) of CORESETs 5-6. Finally, the CORESETs are prioritized based on the SS set index, in ascending order. In the example of FIG. 3, the SS set index (1) of CORESET 3 is less than the SS set index (3) of CORESET 4. Also, as shown in FIG. 3, the SS set index (2) of CORESET 5 is less than the SS set index (3) of CORESET 6.

After prioritizing the CORESETs, the UE selects a CORESET from the prioritized list of CORESETs. The UE may select a first QCL-Type-D property of the first CORESET as a first monitoring QCL-Type-D property. The UE may then select a second QCL-Type-D property of a second CORESET from the prioritized list of CORESETs as a second monitoring QCL-Type-D property. After determining the first monitoring QCL-Type-D property and the second monitoring QCL-Type-D property, the UE identifies, from the prioritized list of CORESETs, a set of monitoring CORESETs. Each monitoring CORESET of the set of monitoring CORESETs is associated with a same QCL-Type-D property as one or both of the first monitoring QCL-Type-D property and the second monitoring QCL-Type-D property based on a number of QCL-Type-D properties of the monitoring CORESET. The UE may then monitor a set of PDCCH candidates corresponding to the first CORESET, the second CORESET, and the set of monitoring CORESETs.

In one implementation, when identifying the set of monitoring CORESETs, the UE excludes the first CORESET and the second CORESET from the prioritized list of CORESETs. The UE may then identify, from the prioritized list of CORESETs after excluding the first CORESET and the second CORESET, a first set of CORESETs. Each CORESET of the first set of CORESETs is associated with one QCL-Type-D property and the one QCL-Type-D property is the same as the first monitoring QCL-Type-D property or the second monitoring QCL-Type-D property. Furthermore, the UE identifies a second set of CORESETs from the prioritized list. Each CORESET of the second set of CORESETs is associated with two QCL-Type-D properties. In this implementation, a primary QCL-Type-D property of each CORESET of the second set of CORESETs is the same as the first monitoring QCL-Type-D property. Also, a secondary QCL-Type-D property of each CORESET of the second set of CORESETs is the same as the second monitoring QCL-Type-D property. The set of monitoring CORESETs includes the first set of CORESETs and the second set of CORESETs described above.

In one configuration, the UE selects the CORESET with a highest priority, such as CORESET 1 of FIG. 3. In this configuration, if the selected CORESET has two active TCI states (for example, the CORESET is associated with two QCL-Type-D properties), the primary QCL-Type-D property is the first monitoring QCL-Type-D property and the secondary QCL-Type-D property is the second monitoring QCL-Type-D property. In this configuration, the selected CORESET is the first and second CORESET. In the example of FIG. 3, CORESET 1 is not associated with two QCL-Type-D properties. Therefore, CORESET 1 may be the first CORESET and the UE selects a second CORESET.

In the current configuration, if the selected CORESET has one active TCI state (for example, the CORESET is associated with one QCL-Type-D property), the UE selects a second QCL-Type-D property from the prioritized list. That is, the selected CORESET is a first CORESET and the one QCL-Type-D property of the first CORESET is the first monitoring QCL-Type-D property. Additionally, after selecting the first CORESET, the UE excludes a first set of CORESETs from the prioritized list of CORESETs. Each CORESET in the first set of CORESETs is associated with one QCL-Type-D property, where the one QCL-Type-D property is equal to the first monitoring QCL-Type-D property. Furthermore, the UE may exclude a second set of CORESETs from the prioritized list of CORESETs. In this example, each CORESET of the second set of CORESETs may be associated with two QCL-Type-D properties, and each one of the two QCL-Type-D properties is different from the first monitoring QCL-Type-D property. In this configuration, the UE selects the second CORESET from the prioritized list of CORESETs after excluding the first set of CORESETs and the second set of CORESETs. The second CORESET may be a highest priority CORESET of CORESETs remaining in the prioritized list. In one implementation, the UE may determine the prioritized list of CORESETs is empty after excluding the first set of CORESETs and the second set of CORESETs. In this implementation, the second CORESET is a highest priority CORESET in the second set of CORESETs.

As an example, in FIG. 3, CORESET 1 is selected as the first CORESET because CORESET 1 has the highest priority. Also, CORESET 1 is associated with one QCL-Type-D property (x), such that QCL-Type-D property (x) is the first monitoring QCL-Type-D property. Additionally, because CORESET 1 is associated with one QCL-Type-D property, the UE selects a second CORESET. In the example of FIG. 3, none of the CORESETs include two QCL-Type-D properties where both QCL-Type-D properties are different from the QCL-Type-D property of CORESET 1. Therefore, CORESET 2 is the second CORESET, because CORESET 2 has the next highest priority. In this example, the first monitoring QCL-Type-D property is (x) and the second monitoring QCL-Type-D property is (y). Additionally, in this example, the set of monitoring CORESETs includes CORESET 5.

In another aspect of the present disclosure, if the first CORESET is associated with two QCL-Type-D properties, only a primary QCL-Type-D property is considered. Thus, in this configuration, the one QCL-Type-D property or the primary QCL-Type-D property of the first CORESET is the first monitoring QCL-Type-D property. In this configuration, after selecting the first CORESET, the UE excludes a first set of CORESETs from the prioritized list of CORESETs. Each CORESET in the first set of CORESETs is associated with one QCL-Type-D property, where the one QCL-Type-D property is equal to the first monitoring QCL-Type-D property. Furthermore, the UE may exclude a second set of CORESETs from the prioritized list of CORESETs. In this example, each CORESET of the second set of CORESETs may be associated with two QCL-Type-D properties, and each primary QCL-Type-D property of the two QCL-Type-D properties is the same as the first monitoring QCL-Type-D property. In this configuration, the UE selects the second CORESET from the prioritized list of CORESETs after excluding the first set of CORESETs and the second set of CORESETs.

FIG. 3 provides examples of the current aspect. In these examples, the UE selects CORESET 1 as the first CORESET and QCL-Type-D property (x) as the first monitoring QCL-Type-D property. After selecting the first CORESET, the UE excludes CORESET 2 because a primary QCL-Type-D property (x) of CORESET 2 is the same as the first monitoring QCL-Type-D property. Therefore, the UE selects CORESET 3 as the second CORESET, where QCL-Type-D property (z) is the second monitoring QCL-Type-D property. Furthermore, CORESETs 4 and 6 may be included in the set of monitoring CORESETs, based on CORESETs 4 and 6 being associated with a same QCL-Type-D property as one or both of the first monitoring QCL-Type-D property and the second monitoring QCL-Type-D property.

In another aspect of the present disclosure, a UE may exclude all CORESETs with two QCL-Type-D properties. That is, the UE may exclude a first set of CORESETs from the prioritized list of CORESETs. In this example, each CORESET of the first set of CORESETs may be associated with two QCL-Type-D properties. After excluding the first set of CORESETs, the UE selects the first CORESET. The first CORESET may be a highest priority CORESET remaining in the prioritized list. In this aspect, the one QCL-Type-D property of the first CORESET is the first monitoring QCL-Type-D property. In this configuration, after selecting the first CORESET, the UE excludes a second set of CORESETs from the prioritized list of CORESETs. Each CORESET in the second set of CORESETs is associated with one QCL-Type-D property, where the one QCL-Type-D property is equal to the first monitoring QCL-Type-D property. Finally, in this aspect, the UE selects the second CORESET from the prioritized list of CORESETs after excluding the first set of CORESETs and the second set of CORESETs. The second CORESET may be a highest priority CORESET remaining in the prioritized list of CORESETs.

As the examples of FIG. 3, the UE may first exclude CORESETs 2 and 4 because both CORESETs 2 and 4 are associated with two QCL-Type-D properties. In this example, after excluding CORESETs 2 and 4, the UE selects CORESET 1 as the first CORESET, and QCL-Type-D property (x) as the first monitoring QCL-Type-D property. After selecting the first CORESET, the UE selects CORESET 3 as the second CORESET, and QCL-Type-D property (z) as the second monitoring QCL-Type-D property. Furthermore, CORESETs 4 and 6 may be included in the set of monitoring CORESETs, based on CORESETs 4 and 6 being associated with a same QCL-Type-D property as one or both of the first monitoring QCL-Type-D property and the second monitoring QCL-Type-D property.

In yet another aspect of the present disclosure, the UE determines one or more CORESETs of the multiple CORESETs are associated with two QCL-Type-D properties. In response to the determining, the UE excludes each CORE- SET associated with one QCL-Type-D property from the multiple CORESETs. After excluding each CORESET, the UE generates the prioritized list of CORESETs. In this aspect, the CORESET with a highest priority in the prioritized list is selected as the first CORESET and the second CORESET. The UE monitors PDCCH in the first CORESET and the second CORESET, and also in any other CORESETs having the same one or both QCL-Type-D properties of the determined CORESET, including CORESETs associated with one QCL-Type-D property.

In the examples of FIG. 3, the UE may determine CORESETs 2 and 4 include two QCL-Type-D properties. Therefore, the UE may exclude the CORESETs (for example, CORESETs 1, 3, 5, and 6) associated with one QCL-Type-D property. The UE may then select CORESET 2 as the first and second CORESET, where QCL-Type-D property (x) is the first monitoring QCL-Type-D property and QCL-Type-D property (y) is the second monitoring QCL-Type-D property. Furthermore, CORESETs 1 and 5 may be included in the set of monitoring CORESETs, based on CORESETs 1 and 5 being associated with a same QCL-Type-D property as one or both of the first monitoring QCL-Type-D property and the second monitoring QCL-Type-D property.

As described, in some configurations, the second CORESET is the highest priority CORESET remaining in the prioritized list of CORESETs. In another configuration, the priority may be determined as a function of the first CORESET. For example, if the first CORESET corresponds to the CSS, the second CORESET should correspond to the USS. As another example, if the first CORESET is in a first serving cell, the second CORESET should correspond to another serving cell, such as a second serving cell.

As described above, the UE identifies a set of monitoring CORESETs based on the first monitoring QCL-Type-D property and the second monitoring QCL-Type-D property. In one configuration, the UE excludes a CORESET from the set of monitoring CORESETs if the CORESET is associated with two QCL-Type-D properties, and one of the two QCL-Type-D properties is different from the first monitoring QCL-Type-D property or the second monitoring QCL-Type-D property. In another configuration, a CORESET in the set of monitoring CORESETs may be associated with two QCL-Type-D properties, and one of the two QCL-Type-D properties is different from the first monitoring QCL-Type-D property or the second monitoring QCL-Type-D property. In this configuration, the UE does not monitor PDCCH candidates in the QCL-Type-D property of the CORESET that is different from the first monitoring QCL-Type-D property or the second monitoring QCL-Type-D property. Still, in this configuration, the UE may monitor PDCCH candidates in the QCL-Type-D property of the CORESET that is the same as the first monitoring QCL-Type-D property or the second monitoring QCL-Type-D property.

Figure 4A:
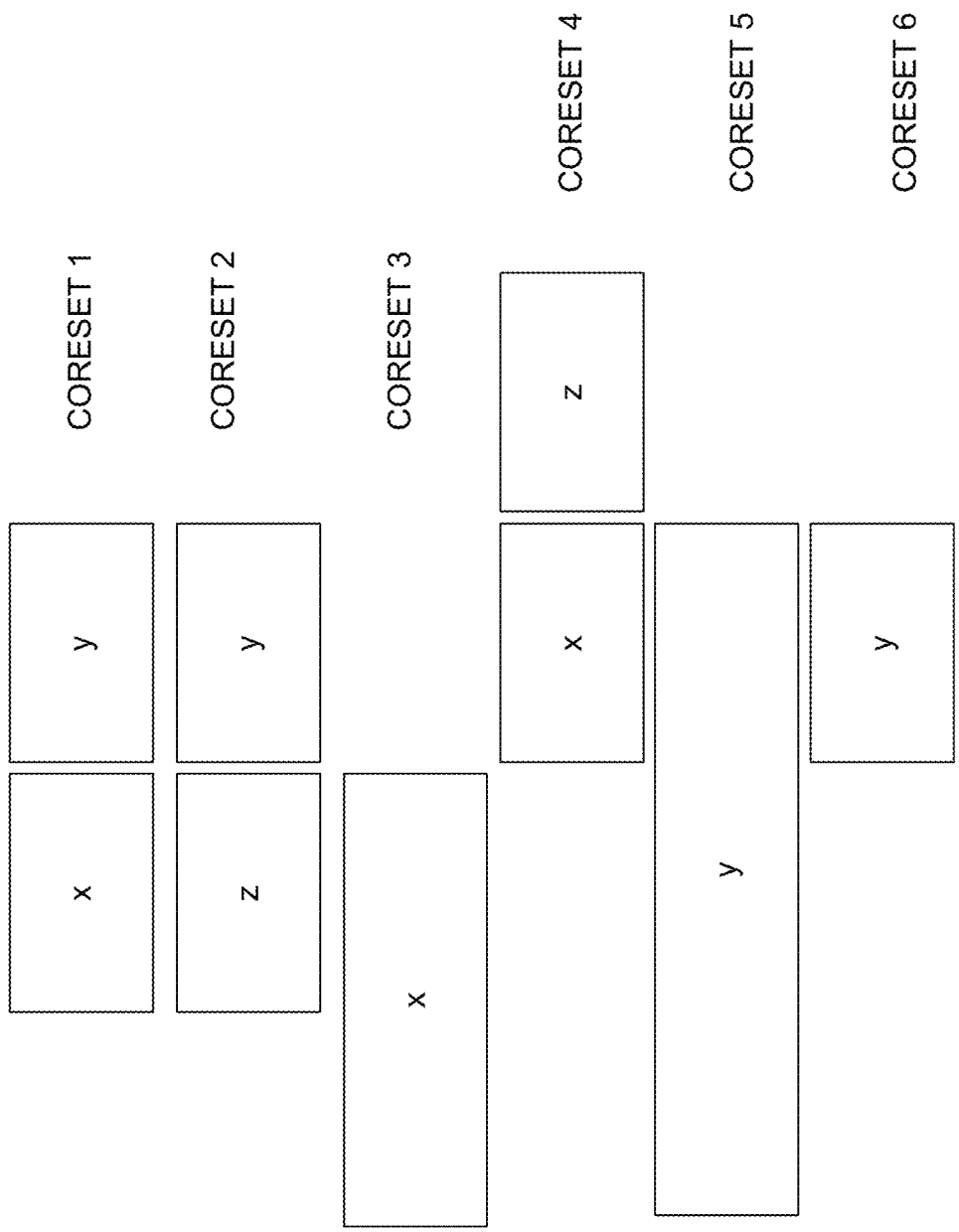
FIG. 4A is a diagram illustrating an example of multiple PDCCH candidates in overlapping PDCCH monitoring occasions, in accordance with aspects of the present disclosure.

In another aspect of the present disclosure, a UE may be configured to process a single beam in a received symbol. In this aspect, the PDCCH candidates may be TDM'd. FIG. 4A is a diagram illustrating an example of multiple PDCCH candidates in overlapping PDCCH monitoring occasions, in accordance with aspects of the present disclosure. In some examples, as shown of FIG. 4A, each CORESET of the multiple CORESETs (shown as CORESETs 1-6) may correspond to one or two PDCCH candidates during a PDCCH monitoring occasion based on whether the CORESET includes one or two QCL-Type-D properties. For example, in FIG. 4A, a first CORESET (CORESET 1) includes two QCL-Type-D properties (x and y) TDM'd over two symbols.

In this aspect, each QCL-Type-D property of a CORESET may occupy one or more symbols, such as one, two, or three symbols. Still, two or more QCL-Type-D properties of the CORESET do not occupy the same symbol.

Figure 4B:
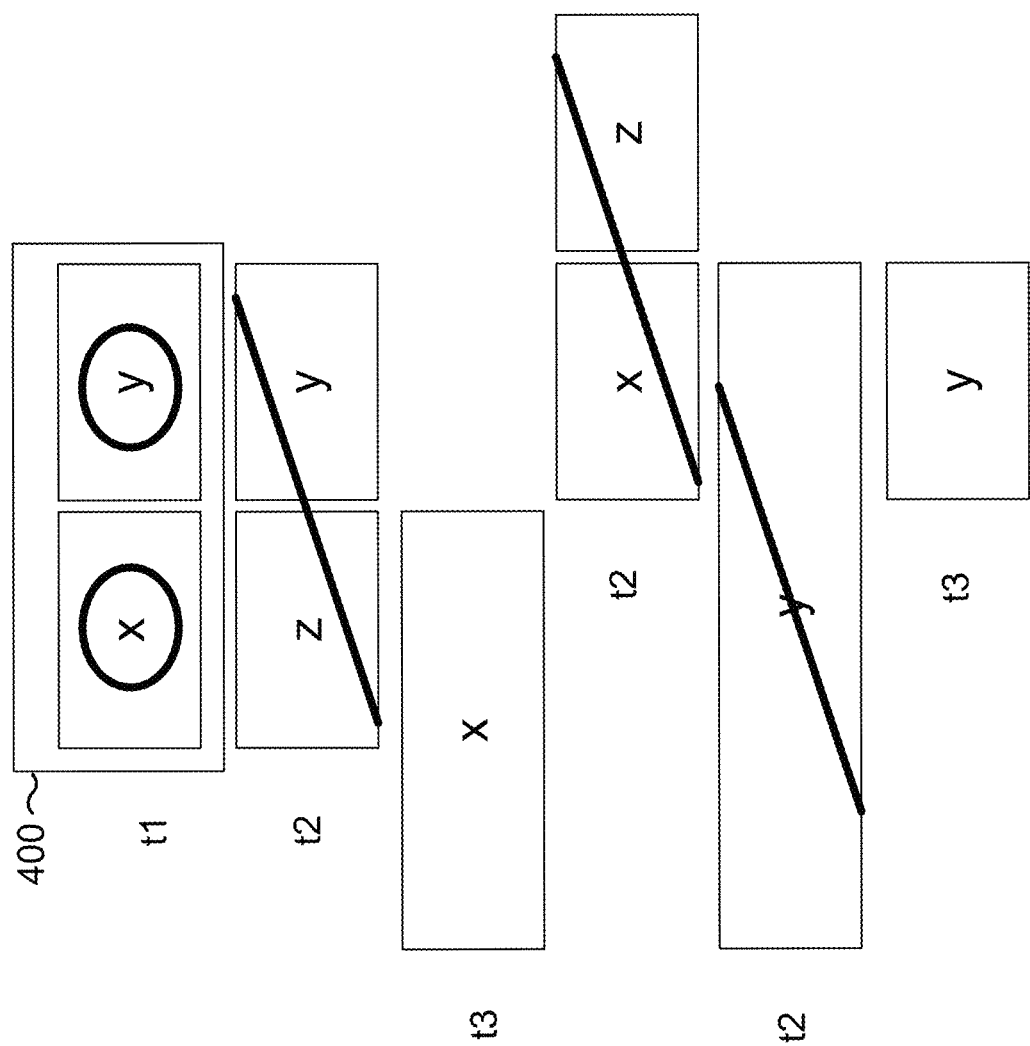
FIG. 4B is a diagram illustrating an example for selecting PDCCH candidates from multiple PDCCH candidates in overlapping PDCCH monitoring occasions, in accordance with aspects of the present disclosure.

FIG. 4B is a diagram illustrating an example for selecting PDCCH candidates from multiple PDCCH candidates in overlapping PDCCH monitoring occasions, in accordance with aspects of the present disclosure. In some examples, as shown in FIG. 4B, at time t1, a UE selects, according to the priority rule, a first highest priority CORESET from the multiple CORESETs as a first CORESET. In these examples, it is assumed the CORESETs (CORESETs 1-6) are prioritized. Therefore, the UE selects CORESET 1 as the first CORESET, where the first CORESET occupies a set of symbols 400. The UE may determine a QCL-Type-D property for each symbol of the first set of symbols. In these examples, the first symbol in the set of symbols 400 is associated with QCL-Type-D property (x) and a second symbol in the first set of symbols 400 is associated with QCL-Type-D property (y).

After determining the QCL-Type-D properties, in one configuration, the UE removes a first set of CORESETs from the multiple CORESETs. Each CORESET of the first set of CORESETs occupies one or more symbols associated with a different QCL-Type-D property than a QCL-Type-D property of an overlapping symbol of the set of symbols 400. For example, in FIG. 4B, at time t2, CORESETs 2, 4, and 5 may be removed because each one of CORESETs 2, 4, and 5 occupies a symbol comprising a different QCL-Type-D property than an overlapping symbol of the set of symbols 400.

After excluding the first set of CORESETs, the UE identifies, from the remaining CORESETs, a second set of CORESETs. Each CORESET of the second set of CORESETs occupies a symbol comprising a same QCL-Type-D property as an overlapping symbol of the set of symbols 400. PDCCH candidates in the second set of CORESETs may be monitored. For example, in FIG. 4B, at time t3, the UE identifies CORESETs 3 and 6 as having a symbol with a same QCL-Type-D property as an overlapping symbol of the set of symbols 400. Thus, the PDCCH candidates of CORESETs 3 and 6 may be monitored. That is, in this configuration, the UE monitors PDCCH candidates of the first CORESET (for example, CORESET 1) and the second set of CORESETs (for example, CORESETs 3 and 6).

In one configuration, from the second set of CORESETs, the UE identifies a third set of CORESETs that completely overlaps the set of symbols 400. For example, in FIG. 4B, the symbol associated with CORESET 6 completely overlaps the second symbol of the set of symbols 400. As another example, in FIG. 4B, the symbols associated with CORESET 2 do not completely overlap the set of symbols 400. That is, the symbol of CORESET 2 includes a non-overlapping portion. In this configuration, the third set of CORESETs may be removed from further consideration. Still, the PDCCH candidates of the third set of CORESETs may be monitored. In this configuration, after removing the third set of CORESETs, the UE repeats the process of times t1-t3 until are CORESETs are selected for monitoring or excluded.

In another configuration, the UE identifies a first CORESET with two QCL-Type-D properties, such as CORESET 1 of FIG. 4B. The UE may determine a QCL-Type-D property for each symbol occupied by the first CORESET. After identifying the first CORESET, the UE identifies one or more second CORESETs that are symbol-wise consistent with the QCL-Type-D properties of the first CORESET.

That is, the second CORESETs do not have a symbol with a QCL-Type-D property different from a QCL-Type-D property of an overlapping symbol of the first CORESET. In this configuration, the UE monitors PDCCH candidates of the first and second CORESETs.

In one configuration, a per-symbol QCL-Type-D determination may be performed for a UE configured to receive two beams simultaneously. In this configuration, for each symbol of the multiple CORESETs, the UE determines two different QCL-Type-D properties. That is, the UE may determine a first monitoring QCL-Type-D property and a second QCL-Type-D property for each symbol. The process for determining the first monitoring QCL-Type-D property and the second QCL-Type-D property may be based on one or more aspects described above with reference to FIG. 3. In this configuration, the UE monitors PDCCH candidates for a first CORESET associated with the first monitoring QCL-Type-D property, a second CORESET associated with the second monitoring QCL-Type-D property, and a set of monitoring CORESETs. In one configuration, if a CORESET has one or more symbols with a QCL-Type-D property that is different from the first monitoring QCL-Type-D property and the second monitoring QCL-Type-D property of an overlapping symbol of the first CORESET and the second CORESET, the CORESET is excluded from the set of monitoring CORESETs. Additionally, if a CORESET occupies one or more symbols, and each symbol has a same QCL-Type-D property as the first monitoring QCL-Type-D property or the second monitoring QCL-Type-D property of an overlapping symbol of the first CORESET and the second CORESET, the CORESET is added to the set of monitoring CORESETs.

Figure 5:
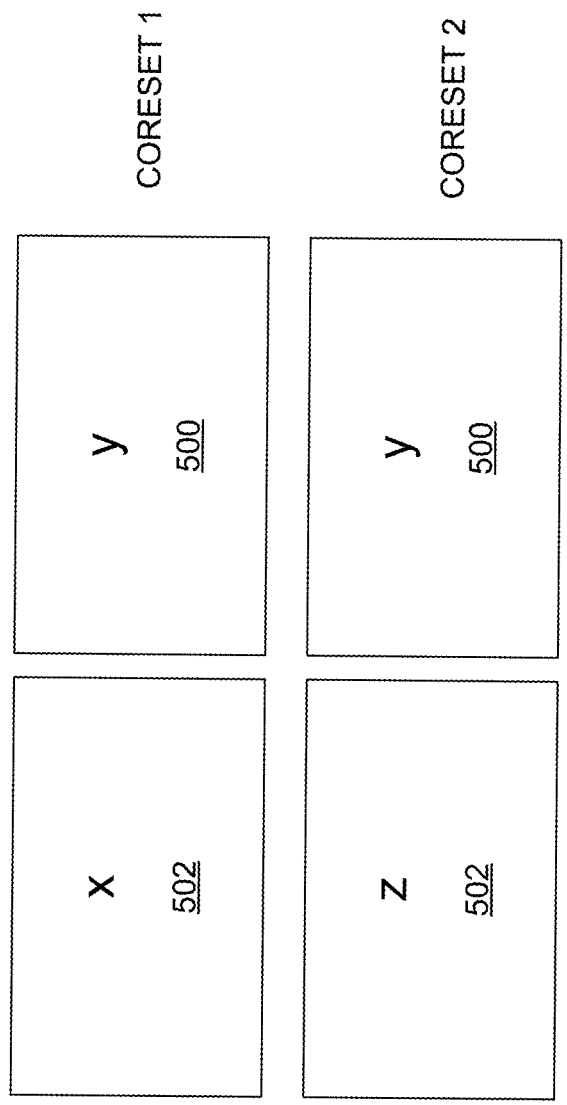
FIG. 5 is a diagram illustrating an example of partial PDCCH candidate monitoring, in accordance with aspects of the present disclosure.

In yet another aspect of the present disclosure, PDCCH candidates of a CORESET associated with two QCL-Type-D properties may be partially monitored. FIG. 5 is a diagram illustrating an example of partial PDCCH candidate monitoring, in accordance with aspects of the present disclosure. In the examples of FIG. 5, a second CORESET (CORESET 2) may be associated with two QCL-Type-D properties (z and y), TDM'd over two symbols. A first CORESET (CORESET 1) may be selected for monitoring, such that the first monitoring QCL-Type-D property is (x) and the second monitoring QCL-Type-D property is (y). In these examples, only one symbol of CORESET 2 has a same QCL-Type-D property as an overlapping symbol. That is, as shown in FIG. 5, second symbols 500 of CORESETs 1 and 2 have the same QCL-Type-D property (y), while first symbols 502 of CORESETs 1 and 2 have different QCL-Type-D properties (x and z). In this example, the UE may monitor PDCCH candidates on the second symbol 500 of CORESET 2, while excluding PDCCH candidates on the first symbol 502 of CORESET 2. The examples of FIG. 5 are not limited to a TDM scenario. The partial PDCCH monitoring may be applied to other aspects, such as those described for FDM'd PDCCH candidates and SDM'd PDCCH candidates.

Figure 6:
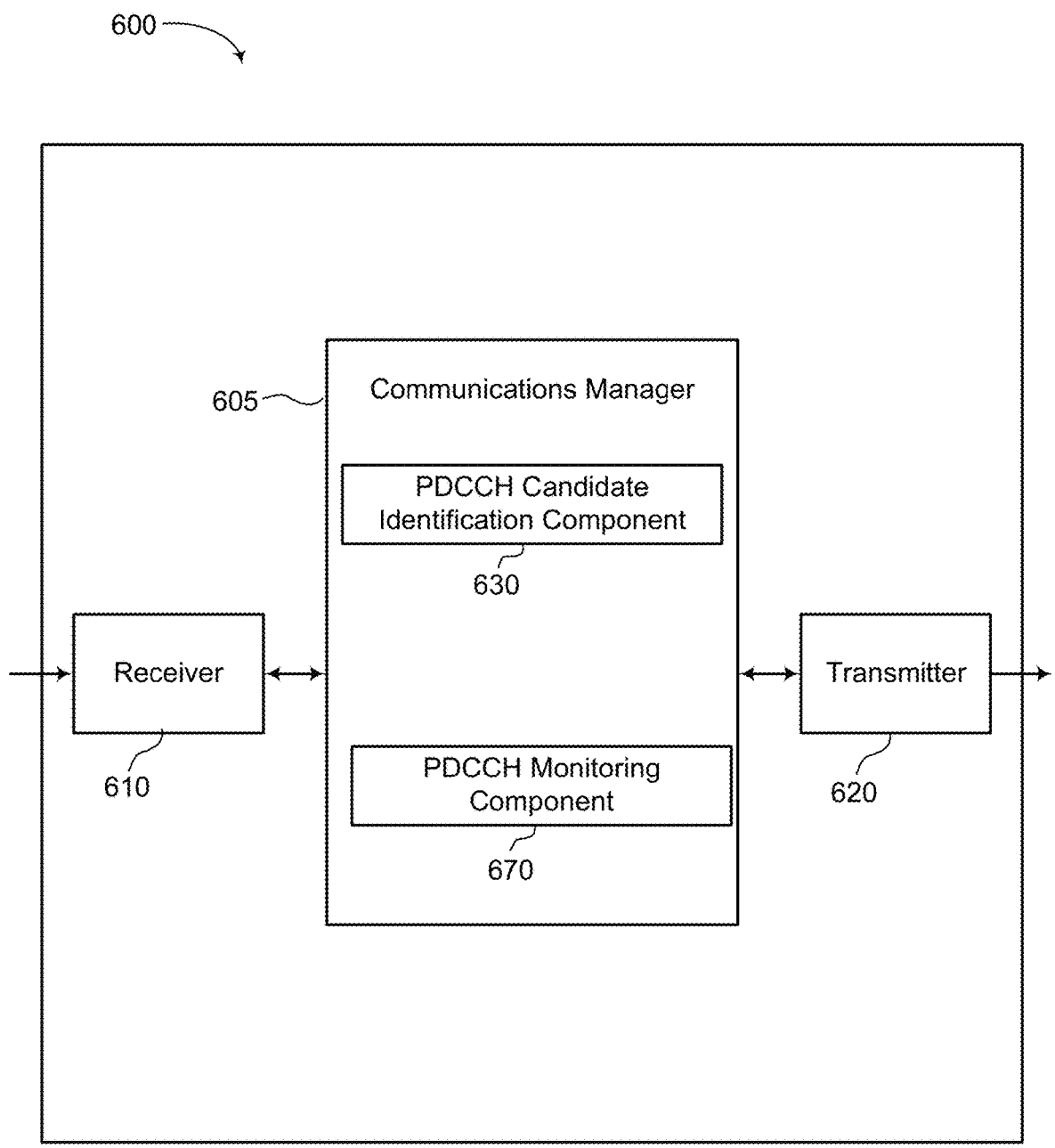
FIG. 6 is a block diagram illustrating an example of a wireless communication device that supports identifying a set of PDCCH candidates for monitoring from multiple PDCCH candidates in overlapping PDCCH monitoring occasions across multiple control resource sets (CORESETs), in accordance with aspects of the present disclosure.

FIG. 6 is a block diagram illustrating an example of a wireless communication device 600 that supports identifying a set of PDCCH candidates for monitoring from multiple PDCCH candidates in overlapping PDCCH monitoring occasions across a plurality of CORESETs, in accordance with aspects of the present disclosure. The device 600 may be an example of aspects of a UE 120 described with reference to FIG. 1. The wireless communication device 600 may include a receiver 610, a communications manager 605, a transmitter 620, a PDCCH candidate identification component 630, a prioritized list generation component 640, a CORESET selection component 650, a PDCCH candidate selection component 660, and a PDCCH monitoring component 670, which may be in communication with one another (for example, via one or more buses). In some examples, the wireless communication device 600 is configured to perform operations including operations of the process 800 described below with reference to FIG. 8.

In some examples, the wireless communication device 600 can include a chip, chipset, package, or device that includes at least one processor and at least one modem (for example, a 5G modem or other cellular modem). In some examples, the communications manager 605, or its subcomponents, may be separate and distinct components. In some examples, at least some components of the communications manager 605 are implemented at least in part as software stored in a memory. For example, portions of one or more of the components of the communications manager 605 can be implemented as non-transitory code executable by the processor to perform the functions or operations of the respective component.

The receiver 610 may receive one or more of reference signals (for example, periodically configured CSI-RSs, aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a base station 110 described with reference to FIG. 1.

The received information may be passed on to other components of the device 600. The receiver 610 may be an example of aspects of the receive processor 258 described with reference to FIG. 2. The receiver 610 may include a set of radio frequency (RF) chains that are coupled with or otherwise utilize a set of antennas (for example, the set of antennas may be an example of aspects of the antennas 252a through 252r described with reference to FIG. 2).

The transmitter 620 may transmit signals generated by the communications manager 605 or other components of the wireless communication device 600. In some examples, the transmitter 620 may be collocated with the receiver 610 in a transceiver. The transmitter 620 may be an example of aspects of the transmit processor 254 described with reference to FIG. 2. The transmitter 620 may be coupled with or otherwise utilize a set of antennas (for example, the set of antennas may be an example of aspects of the antennas 252a through 252r described with reference to FIG. 2), which may be antenna elements shared with the receiver 610. In some examples, the transmitter 620 is configured to transmit control information in a physical uplink control channel (PUCCH) and data in a physical uplink shared channel (PUSCH).

The communications manager 605 may be an example of aspects of the controller/processor 280 described with reference to FIG. 2. The communications manager 605 may include the PDCCH candidate identification component 630, and the PDCCH monitoring component 670. In some examples, working in conjunction with the receiver 610, the PDCCH candidate identification component 630 may receive a message indicating multiple CORESETs. Each CORESET of the multiple CORESETs may include one or more QCL-Type-D properties and associated with a respective PDCCH monitoring occasion of overlapping PDCCH monitoring occasions. Additionally, one or more respective PDCCH candidates may correspond to the respective PDCCH monitoring occasion. Additionally, working in conjunction with the receiver 610, the PDCCH candidate identification component 630 may receive, on one or more CCs in a same band, a plurality of simultaneous beams comprising a plurality of PDCCH candidates. Additionally, in these examples, working in conjunction with one or more of the receiver 610 and the PDCCH candidate identification component 630 the PDCCH monitoring component 670 may monitoring a set of PDCCH candidates of the multiple PDCCH candidates associated with a first CORESET of the multiple CORESETs associated with a first QCL-Type-D property, a second CORESET of the multiple CORESETs comprising a second QCL-Type-D property, and a set of monitoring CORESETs of the multiple CORESETs, each monitoring CORESET may be associated with one or both of the first QCL-Type-D property or the second QCL-Type-D property based on a number of QCL-Type-D properties of a respective monitoring CORESET. In some examples, the first CORESET may be a highest priority CORESET based on a set of priority rules.

Figure 7:
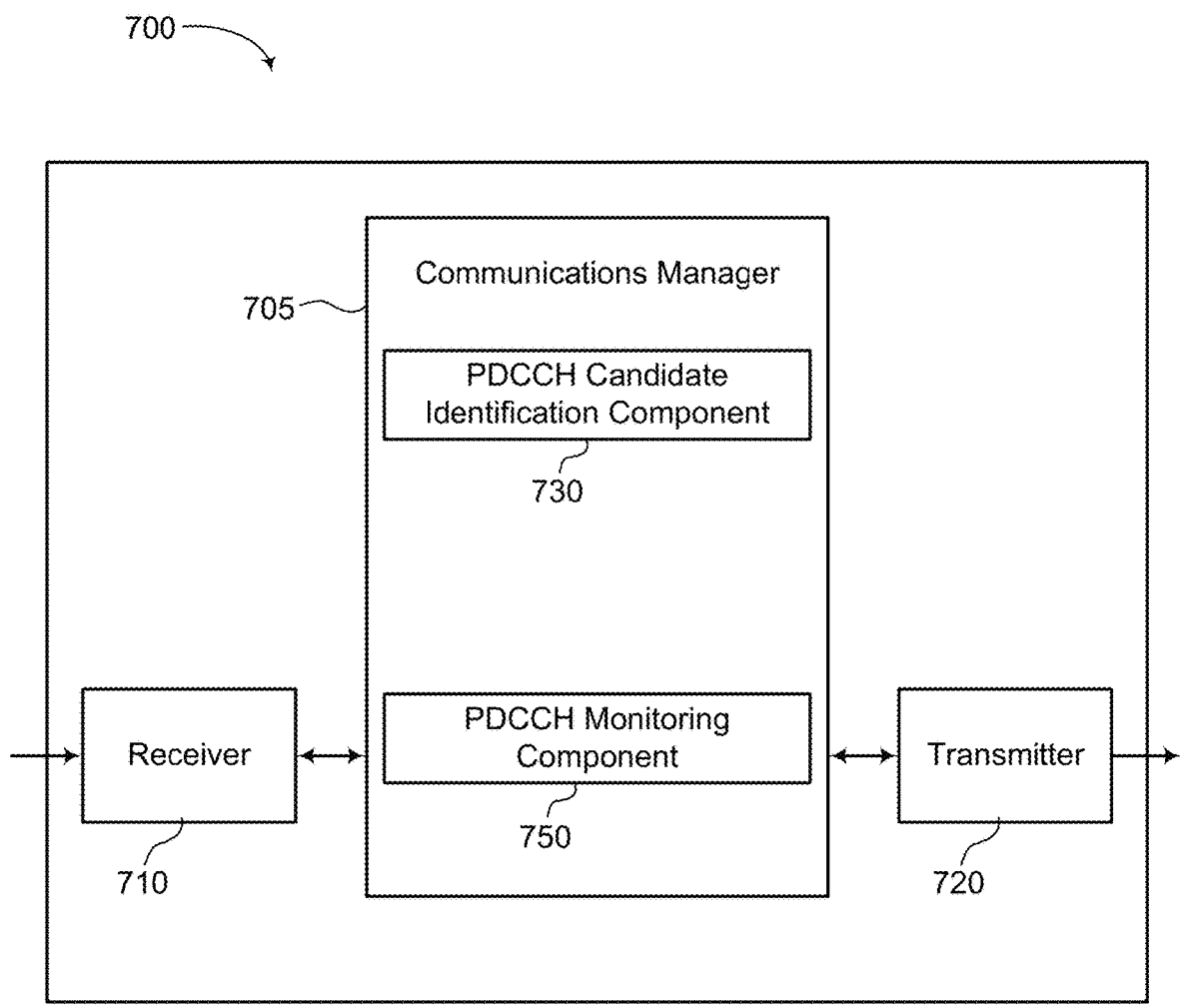
FIG. 7 is a block diagram illustrating an example of a wireless communication device that supports identifying a set of PDCCH candidates for monitoring from multiple PDCCH candidates in overlapping PDCCH monitoring occasions across multiple CORESETs, in accordance with aspects of the present disclosure.

FIG. 7 is a block diagram illustrating an example of a wireless communication device 700 that supports identifying a set of PDCCH candidates for monitoring from multiple PDCCH candidates in overlapping PDCCH monitoring occasions across multiple CORESETs, in accordance with aspects of the present disclosure. The device 700 may be an example of aspects of a UE 120 described with reference to FIG. 1. The wireless communication device 700 may include a receiver 710, a communications manager 705, a transmitter 720, a PDCCH candidate identification component 730, a CORESET selection component 740, and a PDCCH monitoring component 750, which may be in communication with one another (for example, via one or more buses). In some examples, the wireless communication device 700 is configured to perform operations including operations of the process 900 described below with reference to FIG. 9.

In some examples, the wireless communication device 700 can include a chip, chipset, package, or device that includes at least one processor and at least one modem (for example, a 5G modem or other cellular modem). In some examples, the communications manager 705, or its sub-components, may be separate and distinct components. In some examples, at least some components of the communications manager 705 are implemented at least in part as software stored in a memory. For example, portions of one or more of the components of the communications manager 705 can be implemented as non-transitory code executable by the processor to perform the functions or operations of the respective component.

The receiver 710 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a PDSCH). The other wireless communication devices may include, but are not limited to, a base station 110 described with reference to FIG. 1.

The received information may be passed on to other components of the device 700. The receiver 710 may be an example of aspects of the receive processor 258 described with reference to FIG. 2. The receiver 710 may include a set of radio frequency (RF) chains that are coupled with or otherwise utilize a set of antennas (for example, the set of antennas may be an example of aspects of the antennas 252a through 252r described with reference to FIG. 2).

The transmitter 720 may transmit signals generated by the communications manager 705 or other components of the wireless communication device 700. In some examples, the transmitter 720 may be collocated with the receiver 710 in a transceiver. The transmitter 720 may be an example of aspects of the transmit processor 254 described with reference to FIG. 2. The transmitter 720 may be coupled with or otherwise utilize a set of antennas (for example, the set of antennas may be an example of aspects of the antennas 252a through 252r described with reference to FIG. 2), which may be antenna elements shared with the receiver 710. In some examples, the transmitter 720 is configured to transmit control information in a physical uplink control channel (PUCCH) and data in a PUSCH.

The communications manager 705 may be an example of aspects of the controller/processor 280 described with reference to FIG. 2. The communications manager 705 may include the PDCCH candidate identification component 730 and the PDCCH monitoring component 750. In one implementation, working in conjunction with the receiver 710, the PDCCH candidate identification component 730 may receiving a message indicating a multiple CORESETs. In some examples, each CORESET may include one or more QCL-Type-D properties. Additionally, working in conjunction with the receiver 710, the PDCCH candidate identification component 730 may receive a single beam comprising multiple PDCCH candidates in overlapping PDCCH monitoring occasions across the multiple CORESETS. In some examples, working in conjunction with one or more of the receiver 710, the PDCCH candidate identification component 730, the PDCCH monitoring component 750 may monitor PDCCH candidates associated with both a first CORESET occupying a set of symbols and a first set of CORESETs each occupying a single symbol that overlaps one symbol of the set of symbols. The single symbol may be associated with a same QCL-Type-D property as a QCL-Type-D property associated with the one overlapping symbol of the set of symbols, and each symbol of the set of symbols associated with a QCL-Type-D property. In some examples, the first CORESET is a highest priority CORESET based on a set of priority rules.

FIG. 8 is a flow diagram illustrating an example process 800 performed at a UE that supports identifying a set of PDCCH candidates for monitoring from multiple PDCCH candidates in overlapping PDCCH monitoring occasions across multiple CORESETs, in accordance with various aspects of the present disclosure. The example process 800 is an example of identifying a set of PDCCH candidates for monitoring from multiple PDCCH candidates in overlapping PDCCH monitoring occasions across multiple CORESETs, in accordance with various aspects of the present disclosure. The operations of the process 800 may be implemented by a UE, such as a UE 120, or its components, described with reference to FIG. 1. For example, operations of the process 800 may be performed by one or more of the communications manager 605 may include the PDCCH candidate identification component 630, the prioritized list generation component 640, the CORESET selection component 650, the PDCCH candidate selection component 660, or the PDCCH monitoring component 670, as described with reference to FIG. 5. In some examples, a UE may execute a set of instructions to control the functional elements of the UE to perform the operations or functions described below. Additionally, or alternatively, a UE may perform aspects of the operations or functions described below using special-purpose hardware.

Figure 9:
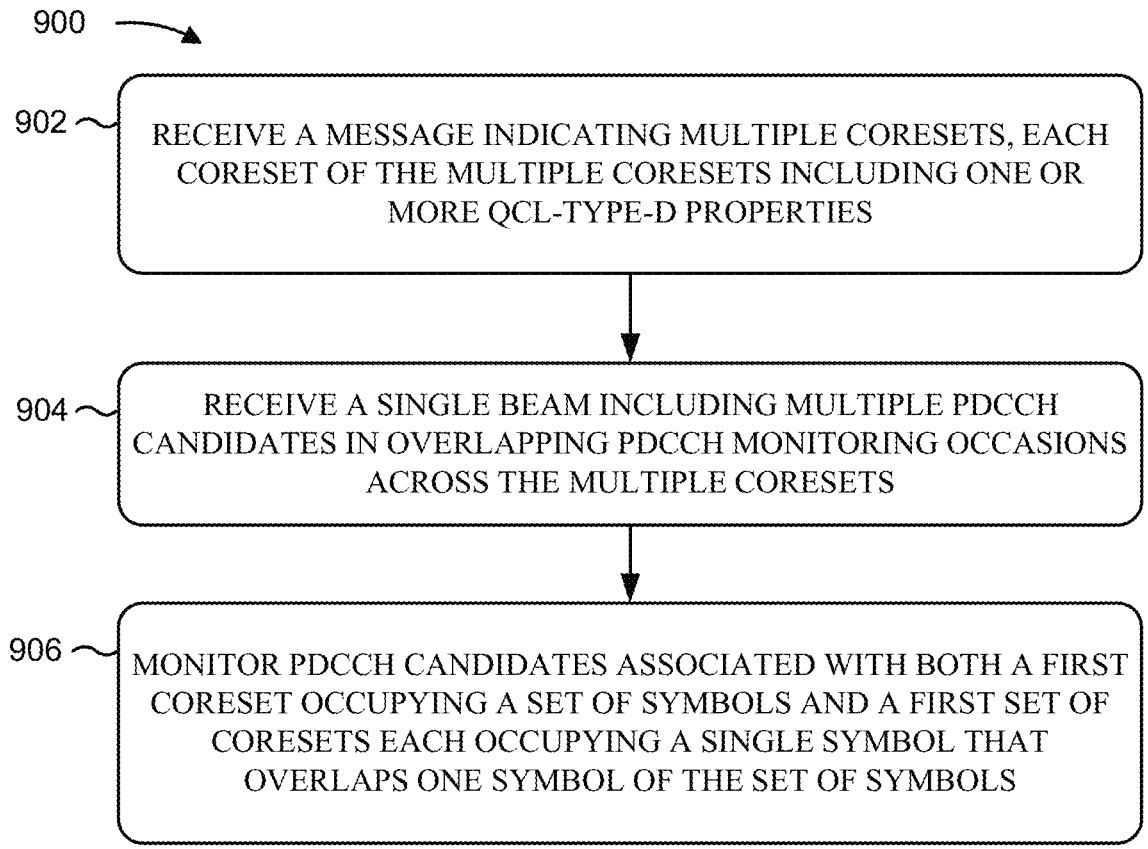
FIG. 9 is a flow diagram illustrating an example process performed at a UE that supports identifying a set of PDCCH candidates for monitoring from multiple PDCCH candidates in overlapping PDCCH monitoring occasions across multiple CORESETs, in accordance with various aspects of the present disclosure.

As shown in FIG. 8, the process 800 begins at block 802 by receiving a message indicating multiple CORESETs, each CORESET of the multiple CORESETs may include one or more QCL-Type-D properties, and each CORESET of the number of CORESETs may be associated with a respective PDCCH monitoring occasion of overlapping PDCCH monitoring occasions. One or more respective PDCCH candidates may correspond to the respective PDCCH monitoring occasion. At block 804, the process 800 receives, on one or more CCs operating on a same band, multiple simultaneous beams comprising multiple PDCCH candidates. At block 806, the process 800 monitors monitoring a set of PDCCH candidates of the plurality of PDCCH candidates associated with a first CORESET of the multiple CORESETs comprising a first QCL-Type-D property, a second CORESET of the multiple CORESETs associated with a second QCL-Type-D property, and a set of monitoring CORESETs of the multiple CORESETs, each monitoring CORESET associated with one or both of the first QCL-Type-D property or the second QCL-Type-D property based on a number of QCL-Type-D properties of a respective monitoring CORESET, and the first CORESET being a highest priority CORESET based on a set of priority rules FIG. 9 is a flow diagram illustrating an example process 900 performed at a UE that supports identifying a set of PDCCH candidates for monitoring from multiple PDCCH candidates in overlapping PDCCH monitoring occasions across multiple CORESETs, in accordance with various aspects of the present disclosure. The example process 900 is an example of identifying a set of PDCCH candidates for monitoring from multiple PDCCH candidates in overlapping PDCCH monitoring occasions across multiple CORESETs, in accordance with various aspects of the present disclosure. The operations of the process 900 may be implemented by a UE, such as a UE 120, or its components, described with reference to FIG. 1. For example, operations of the process 900 may be performed by one or more of the communications manager 705 may include the PDCCH candidate identification component 730, the CORESET selection component 740, or the PDCCH monitoring component 750, as described with reference to FIG. 7. In some examples, a UE may execute a set of instructions to control the functional elements of the UE to perform the operations or functions described below. Additionally, or alternatively, a UE may perform aspects of the operations or functions described below using special-purpose hardware.

As shown in FIG. 9, the process 900 begins at block 902, by receiving a message indicating multiple CORESETs, each CORESET of the multiple CORESETs may include one or more QCL-Type-D properties. At block 904, the process 900 receives a single beam including multiple PDCCH candidates in overlapping PDCCH monitoring occasions across the multiple CORESETS. At block 906, the process 900 monitors PDCCH candidates associated with both a first CORESET occupying a set of symbols and a first set of CORESETs each occupying a single symbol that overlaps one symbol of the set of symbols. The single symbol may be associated with a same QCL-Type-D property as a QCL-Type-D property associated with the one overlapping symbol of the set of symbols, and each symbol of the set of symbols may be associated with a QCL-Type-D property. Additionally, the first CORESET may be a highest priority CORESET based on a set of priority rules.

The following provides an overview of some Aspects of the present disclosure:

Aspect 1. A method of wireless communication performed by a UE, comprising: receiving a message indicating a plurality of CORESETs, each CORESET of the plurality of CORESETs comprising one or more QCL-Type-D properties and associated with a respective PDCCH monitoring occasion of a plurality of overlapping PDCCH monitoring occasions, and one or more respective PDCCH candidates corresponding to the respective PDCCH monitoring occasion; receiving, on one or more CCs in a same band, a plurality of simultaneous beams comprising a plurality of PDCCH candidates; and monitoring a set of PDCCH candidates of the plurality of PDCCH candidates associated with a first CORESET of the plurality of CORESETs comprising a first QCL-Type-D property, a second CORESET of the plurality of CORESETs comprising a second QCL-Type-D property, and a set of monitoring CORESETs of the plurality of CORESETs, each monitoring CORESET associated with one or both of the first QCL-Type-D property or the second QCL-Type-D property based on a number of QCL-Type-D properties of a respective monitoring CORESET, and the first CORESET being a highest priority CORESET based on a set of priority rules.

Aspect 2. The method of Aspect 1, wherein: the first CORESET comprises a single QCL-Type-D property and the first QCL-Type-D property comprises the single QCL-Type-D property; or the first CORESET comprises two QCL-Type-D properties and the first QCL-Type-D property comprises a first primary QCL-Type-D property of the two QCL-Type-D properties.

Aspect 3. The method of Aspect 2, wherein: a secondary QCL-Type-D property of the first CORESET is associated with the second QCL-Type-D property based on the first CORESET comprising two QCL-Type-D properties; and the first CORESET is a same CORESET as the second CORESET.

Aspect 4. The method of Aspect 3, further comprising: excluding, from the plurality of CORESETs, each CORESET comprising a single QCL-Type-D property based on one or more CORESETs of the plurality of CORESETs comprising two QCL-Type-D properties; and prioritizing the plurality of CORESETs after excluding each CORESET comprising the single QCL-Type-D property.

Aspect 5. The method of Aspect 2, further comprising: excluding the first CORESET from the prioritized plurality of CORESETs; and excluding, from the prioritized plurality of CORESETs, a first set of CORESETs based on each CORESET in the first set of CORESETs comprising a single QCL-Type-D property, wherein the single QCL-Type-D property of each CORESET in the first set of CORESETs is equal to the first QCL-Type-D property.

Aspect 6. The method of Aspect 5, further comprising excluding, from the prioritized plurality of CORESETs, a second set of CORESETs based on each CORESET in the second set of CORESETs comprising two QCL-Type-D properties, and based on each one of the two QCL-Type-D properties being different from the first QCL-Type-D property.

Aspect 7. The method of Aspect 6, wherein the second CORESET is a second highest priority CORESET in the second set of CORESETs based on the prioritized plurality of CORESETs being empty after excluding the first set of CORESETs and the second set of CORESETs.

Aspect 8. The method of Aspect 6, further comprising selecting the second CORESET from the prioritized plurality of CORESETs after excluding the first set of CORESETs and the second set of CORESETs.

Aspect 9. The method of Aspect 8, further comprising: selecting the second CORESET based on the second CORESET being a second highest priority CORESET in the prioritized plurality of CORESETs; or selecting the second CORESET based one or more of a search space (SS) type, a serving cell index, or an SS set index of the first CORESET.

Aspect 10. The method of Aspect 8, further comprising: excluding the second set of CORESETs prior to excluding the first set of CORESETs, wherein the first CORESET is selected after excluding the second set of CORESETs and prior to excluding the first set of CORESETs.

Aspect 11. The method of Aspect 5, further comprising: excluding, from the prioritized plurality of CORESETs, a second set of CORESETs based on each CORESET in the second set of CORESETs comprising two QCL-Type-D properties, and each secondary QCL-Type-D property of each CORESET in the second set of CORESETs being equal to the first QCL-Type-D property; and selecting the second CORESET from the prioritized plurality of CORESETs after excluding the first set of CORESETs, wherein: the second QCL-Type-D property is a single QCL-Type-D property of the second CORESET when the second CORESET comprises the single QCL-Type-D property; and the second QCL-Type-D property is a secondary QCL-Type-D property of two QCL-Type-D properties of the second CORESET when the second CORESET comprises the two QCL-Type-D properties.

Aspect 12. The method of any one of Aspects 1-11, wherein: the set of priority rules comprise one or more of prioritizing in order of a search space (SS) type, prioritizing in order of a serving cell index, or prioritizing in order of an SS set index; and the search space type comprises a common search space (CSS) and a UE-specific search space (USS).

Aspect 13. The method of any one of Aspects 1-12, further comprising identifying a set of CORESETs comprising two QCL-Type-D properties, wherein one QCL-Type-D property from the two QCL-Type-D properties of the set of CORESETs is different from the first QCL-Type-D property and the second QCL-Type property.

Aspect 14. The method of Aspect 13, further comprising excluding each PDCCH candidate of the set of CORESETs from the set of PDCCH candidates.

Aspect 15. The method of Aspect 13, wherein each PDCCH candidate is excluded based on a single QCL-Type-D property of each PDCCH candidate being different from both the first monitoring QCL-Type-D property and the second monitoring QCL-Type-D property.

Aspect 16. The method of any one of Aspects 1-15, wherein: the plurality of CORESETs occupy a plurality of symbols; and the method further comprises determining two QCL-Type-D properties for each symbol of the plurality of symbols.

Aspect 17. The method of Aspect 16, wherein the two QCL-Type-D properties for one symbol of the plurality of symbols comprise the first QCL-Type-D property and the second QCL-Type-D property.

Aspect 18. The method of any one of Aspects 1-17, further comprising: identifying a third CORESET comprising two QCL-Type-D properties, wherein: a first QCL-Type-D property of the two QCL-Type-D properties of the third CORESET is equal to the first QCL-Type-D property or the second QCL-Type-D property; and a second QCL-Type-D property of the two QCL-Type-D properties of the third CORESET is different from both the first QCL-Type-D property or the second QCL-Type-D property; and including, in the set of PDCCH candidates, a first PDCCH candidate from the plurality of PDCCH candidates corresponding to the first QCL-Type-D property of the third CORESET; and excluding, from the set of PDCCH candidates, a second PDCCH candidate from the plurality of PDCCH candidates corresponding to the second QCL-Type-D property of the third CORESET.

Aspect 19. The method of Aspect 18, wherein: the first PDCCH candidate and the second PDCCH candidate are frequency division multiplexed); and the method further comprises monitoring resource element groups (REGs) of the set of PDCCH candidates.

Aspect 20. The method of Aspect 18, wherein: the first PDCCH candidate and the second PDCCH candidate are space division multiplexed; and the method further comprises monitoring beams of the set of PDCCH candidates.

Aspect 21. The method of any one of Aspects 1-20, wherein identifying the set of monitoring CORESETs from the prioritized plurality of CORESETs comprises: excluding the first CORESET and the second CORESET from the prioritized plurality of CORESETs; identifying, from the prioritized plurality of CORESETs after excluding the first CORESET and the second CORESET, a first set of CORESETs based on each CORESET of the first set of CORESETs comprises a single QCL-Type-D property being the same as the first QCL-Type-D property or the second QCL-Type-D property; identifying, from the prioritized plurality of CORESETs, a second set of CORESETs, based on each CORESET of the second set of CORESETs comprising two QCL-Type-D properties, a primary QCL-Type-D property of each CORESET of the second set of CORESETs being the same as the first QCL-Type-D property, and a secondary QCL-Type-D property of each CORESET of the second set of CORESETs being the same as the second QCL-Type-D property; and identifying the first set of CORESETs and the second set of CORESETs as the set of monitoring CORESETs.

Aspect 22. The method of any one of Aspects 1-21, wherein each QCL-Type-D property is associated with a receive beam property.

Aspect 23. A method of wireless communication performed by a UE, comprising: receiving a message indicating a plurality of CORESETs, each CORESET of the plurality of CORESETs comprising one or more QCL-Type-D properties; receiving a single beam comprising a plurality of PDCCH candidates in overlapping PDCCH monitoring occasions across the plurality of CORESETS; monitoring PDCCH candidates associated with both a first CORESET and a first set of CORESETs each occupying a single symbol that overlaps one symbol of the set of symbols, the single symbol associated with a same QCL-Type-D property as a QCL-Type-D property associated with the one overlapping symbol of the set of symbols, each symbol of the set of symbols associated with a QCL-Type-D property, and the first CORESET being a highest priority CORESET based on a set of priority rules.

Aspect 24. The method of Aspect 23, further comprising removing a second set of CORESETs from the plurality of CORESETs, wherein each CORESET of the second set of CORESETs occupies a symbol that overlap one of the set of symbols, the symbol that overlap one of the set of symbols associated with a different QCL-Type-D property than a QCL-Type-D property associated with the one overlapping symbol of the set of symbols.

Aspect 25. The method of Aspect 24, further comprising: removing the first set of CORESETs after removing the second set of CORESETS; identifying remaining CORESETs from the plurality of CORESETs in response to removing the second set of CORESETs; selecting, according to the set of priority rules, a second highest priority CORESET from the remaining CORESETs as a second CORESET; and monitoring PDCCH candidates of the second CORESET in addition to monitoring the PDCCH candidates associated with both the first CORESET and the first set of CORESETs.

Aspect 26. The method of any one of Aspects 23-25, wherein: the set of priority rules comprise one or more of prioritizing in order of a SS type, prioritizing in order of a serving cell index, and prioritizing in order of an SS set index; the search space type comprises a CSS and a UE-specific search space (USS).

Aspect 27. The method of any one of Aspects 23-26, further comprising monitoring a first set of PDCCH candidate associated with a first symbol of a second CORESET based on the first symbol of the second CORESET overlapping one symbol of the set of symbols, the second CORESET comprising two QCL-Type-D properties, a first QCL-Type-D property of the two QCL-Type-D properties associated with the first symbol and a second QCL-Type-D property of the two QCL-Type-D properties associated with a second symbol, the first QCL-Type-D property being equal to a QCL-Type-D property associated with the one overlapping symbol of the set of symbols.

Aspect 28. The method of any one of Aspects 23-27, wherein each QCL-Type-D property is associated with a receive beam property.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A user equipment (UE), comprising:
   a memory; and
   a processor coupled to the memory, wherein the processor is configured to cause the UE to:
   receive a message indicating a plurality of CORESETs, wherein each CORESET of the plurality of CORESETs comprises one or more quasi-co-location (QCL)-Type-D properties and is associated with a respective physical downlink control channel (PDCCH) monitoring occasion of a plurality of overlapping PDCCH monitoring occasions, and wherein one or more respective PDCCH candidates correspond to the respective PDCCH monitoring occasion;
   receive, on one or more component carriers (CCs) in a same band, a plurality of simultaneous beams comprising a plurality of PDCCH candidates;
   exclude, from the plurality of CORESETs, each CORESET comprising a single QCL-Type-D property based on one or more CORESETs of the plurality of CORESETs comprising two QCL-Type-D properties;
   prioritize the plurality of CORESETs after excluding each CORESET comprising the single QCL-Type-D property; and
   monitor a set of PDCCH candidates of the plurality of PDCCH candidates associated with: a first CORESET of the plurality of CORESETs comprising a first QCL-Type-D property, a second CORESET of the plurality of CORESETs comprising a second QCL-Type-D property, and a set of monitoring CORESETs of the plurality of CORESETs each associated with one or both of the first QCL-Type-D property or the second QCL-Type-D property based on a number of QCL- Type-D properties of the respective monitoring CORESET, wherein the first CORESET is a highest priority CORESET based on a set of priority rules.

2. The UE of claim 1, wherein:
the first CORESET comprises only the first QCL-Type-D property; or
the first CORESET comprises the two QCL-Type-D properties and the first QCL-Type-D property comprises a first primary QCL-Type-D property of the two QCL-Type-D properties.

3. The UE of claim 2, wherein:
a secondary QCL-Type-D property of the first CORESET comprises the second QCL-Type-D property based on the first CORESET comprising the two QCL-Type-D properties; and
the first CORESET is a same CORESET as the second CORESET.

4. The UE of claim 1, wherein:
the set of priority rules comprise one or more of: prioritize in order of a search space (SS) type, prioritize in order of a serving cell index, or prioritize in order of an SS set index; and
the search space type comprises a common search space (CSS) and a UE-specific search space (USS).

5. The UE of claim 1, wherein each QCL-Type-D property is associated with a receive beam property.

6. A user equipment (UE), comprising:
a memory; and
a processor coupled to the memory, wherein the processor is configured to cause the UE to:
receive a message indicating a plurality of CORESETs, wherein each CORESET of the plurality of CORESETs comprises one or more quasi-co-location (QCL)-Type-D properties and is associated with a respective physical downlink control channel (PDCCH) monitoring occasion of a plurality of overlapping PDCCH monitoring occasions, and wherein one or more respective PDCCH candidates correspond to the respective PDCCH monitoring occasion;
receive, on one or more component carriers (CCs) in a same band, a plurality of simultaneous beams comprising a plurality of PDCCH candidates;
monitor a set of PDCCH candidates of the plurality of PDCCH candidates associated with: a first CORESET of the plurality of CORESETs comprising a first QCL-Type-D property, a second CORESET of the plurality of CORESETs comprising a second QCL-Type-D property, and a set of monitoring CORESETs of the plurality of CORESETs each associated with one or both of the first QCL-Type-D property or the second QCL-Type-D property based on a number of QCL-Type-D properties of the respective monitoring CORESET, wherein the first CORESET is a highest priority CORESET based on a set of priority rules;
exclude the first CORESET from a prioritized plurality of CORESETs; and
exclude, from the prioritized plurality of CORESETs, a first set of CORESETs based on each CORESET in the first set of CORESETs comprising a single QCL-Type-D property,
wherein the single QCL-Type-D property of each CORESET in the first set of CORESETs is equal to the first QCL-Type-D property.

7. The UE of claim 6, wherein the processor is configured to cause the UE to exclude, from the prioritized plurality of CORESETs, a second set of CORESETs based on:
each CORESET in the second set of CORESETs comprising two QCL-Type-D properties, and
each one of the two QCL-Type-D properties being different from the first QCL-Type-D property.

8. The UE of claim 7, wherein the second CORESET is a second highest priority CORESET in the second set of CORESETs based on the prioritized plurality of CORESETs being empty after excluding the first set of CORESETs and the second set of CORESETs.

9. The UE of claim 7, wherein the processor is configured to cause the UE to select the second CORESET from the prioritized plurality of CORESETs after excluding the first set of CORESETs and the second set of CORESETs.

10. The UE of claim 9, wherein the processor is configured to cause the UE to:
select the second CORESET based on the second CORESET being a second highest priority CORESET in the prioritized plurality of CORESETs; or
select the second CORESET based one or more of a search space (SS) type, a serving cell index, or an SS set index of the first CORESET.

11. The UE of claim 9, wherein the processor is configured to cause the UE to:
exclude the second set of CORESETs prior to excluding the first set of CORESETs, and
select the first CORESET after excluding the second set of CORESETs and prior to excluding the first set of CORESETs.

12. The UE of claim 6, wherein the processor is configured to cause the UE to:
exclude, from the prioritized plurality of CORESETs, a second set of CORESETs based on each CORESET in the second set of CORESETs comprising two QCL-Type-D properties, and each secondary QCL-Type-D property of each CORESET in the second set of CORESETs being equal to the first QCL-Type-D property; and
select the second CORESET from the prioritized plurality of CORESETs after excluding the first set of CORESETs, wherein:
the second CORESET comprises only the second QCL-Type-D property; or
the second QCL-Type-D property is a secondary QCL-Type-D property of two QCL-Type-D properties of the second CORESET when the second CORESET comprises the two QCL-Type-D properties.

13. The UE of claim 6, wherein each QCL-Type-D property is associated with a receive beam property.

14. The UE of claim 6, wherein the first CORESET comprises only the first QCL-Type-D property.

15. The UE of claim 6, wherein the first CORESET comprises two QCL-Type-D properties, and wherein the first QCL-Type-D property comprises a first primary QCL-Type-D property of the two QCL-Type-D properties.

16. A user equipment (UE), comprising:
a memory; and
a processor coupled to the memory, wherein the processor is configured to cause the UE to:
receive a message indicating a plurality of CORESETs, wherein each CORESET of the plurality of CORESETs comprises one or more quasi-co-location (QCL)-Type-D properties and is associated with a respective physical downlink control channel (PDCCH) monitoring occasion of a plurality of overlapping PDCCH monitoring occasions, and wherein one or more respective PDCCH candidates correspond to the respective PDCCH monitoring occasion;

receive, on one or more component carriers (CCs) in a same band, a plurality of simultaneous beams comprising a plurality of PDCCH candidates;
monitor a set of PDCCH candidates of the plurality of PDCCH candidates associated with: a first CORESET of the plurality of CORESETs comprising a first QCL-Type-D property, a second CORESET of the plurality of CORESETs comprising a second QCL-Type-D property, and a set of monitoring CORESETs of the plurality of CORESETs each associated with one or both of the first QCL-Type-D property or the second QCL-Type-D property based on a number of QCL-Type-D properties of the respective monitoring CORESET, wherein the first CORESET is a highest priority CORESET based on a set of priority rules;
identify a third CORESET comprising two QCL-Type-D properties, wherein a first QCL-Type-D property of the two QCL-Type-D properties of the third CORESET is equal to the first QCL-Type-D property or the second QCL-Type-D property, and wherein a second QCL-Type-D property of the two QCL-Type-D properties of the third CORESET is different from both the first QCL-Type-D property and the second QCL-Type-D property;
include, in the set of PDCCH candidates, a first PDCCH candidate from the plurality of PDCCH candidates corresponding to the first QCL-Type-D property of the third CORESET; and
exclude, from the set of PDCCH candidates, a second PDCCH candidate from the plurality of PDCCH candidates corresponding to the second QCL-Type-D property of the third CORESET.

17. The UE of claim 16, wherein:
the first PDCCH candidate and the second PDCCH candidate are frequency division multiplexed; and
the processor is configured to cause the UE to monitor resource element groups (REGs) of the set of PDCCH candidates.

18. The UE of claim 16, wherein:
the first PDCCH candidate and the second PDCCH candidate are space division multiplexed; and
the processor is configured to cause the UE to monitor beams of the set of PDCCH candidates.

19. The UE of claim 16, wherein each QCL-Type-D property is associated with a receive beam property.

20. The UE of claim 16, wherein the first PDCCH candidate and the second PDCCH candidate are frequency division multiplexed, and wherein, to monitor the set of PDCCH candidates, the processor is configured to cause the UE to monitor resource element groups (REGs) of the set of PDCCH candidates.

21. The UE of claim 16, wherein the first PDCCH candidate and the second PDCCH candidate are space division multiplexed, and wherein, to monitor the set of PDCCH candidates, the processor is configured to cause the UE to monitor beams of the set of PDCCH candidates.

22. A user equipment (UE), comprising:
a memory; and
a processor coupled to the memory, wherein the processor is configured to cause the UE to:
receive a message indicating a plurality of CORESETs, wherein each CORESET of the plurality of CORESETs comprises one or more quasi-co-location (QCL)-Type-D properties and is associated with a respective physical downlink control channel (PDCCH) monitoring occasion of a plurality of overlapping PDCCH monitoring occasions, and wherein one or more respective PDCCH candidates correspond to the respective PDCCH monitoring occasion;
receive, on one or more component carriers (CCs) in a same band, a plurality of simultaneous beams comprising a plurality of PDCCH candidates;
monitor a set of PDCCH candidates of the plurality of PDCCH candidates associated with: a first CORESET of the plurality of CORESETs comprising a first QCL-Type-D property, a second CORESET of the plurality of CORESETs comprising a second QCL-Type-D property, and a set of monitoring CORESETs of the plurality of CORESETs each associated with one or both of the first QCL-Type-D property or the second QCL-Type-D property based on a number of QCL-Type-D properties of the respective monitoring CORESET, wherein the first CORESET is a highest priority CORESET based on a set of priority rules;
exclude the first CORESET and the second CORESET from a prioritized plurality of CORESETs;
identify, from the prioritized plurality of CORESETs after excluding the first CORESET and the second CORESET, a first set of CORESETs based on each CORESET of the first set of CORESETs comprising a single QCL-Type-D property being the same as the first QCL-Type-D property or the second QCL-Type-D property;
identify, from the prioritized plurality of CORESETs, a second set of CORESETs, based on each CORESET of the second set of CORESETs comprising two QCL-Type- D properties, wherein a primary QCL-Type-D property of each CORESET of the second set of CORESETs is the same as the first QCL-Type-D property, and wherein a secondary QCL-Type-D property of each CORESET of the second set of CORESETs is the same as the second QCL-Type-D property; and
identify the first set of CORESETs and the second set of CORESETs as the set of monitoring CORESETs.

23. The UE of claim 22, wherein each QCL-Type-D property is associated with a receive beam property.

* * * * *